(12) United States Patent
Osagawa et al.

(10) Patent No.: US 9,037,338 B2
(45) Date of Patent: May 19, 2015

(54) DRIVING SYSTEM OF UNMANNED VEHICLE AND DRIVING PATH GENERATION METHOD

(75) Inventors: Kenta Osagawa, Fujisawa (JP); Tomonori Ozaki, Kanagawa (JP); Koji Takeda, Tama (JP); Takashi Hiranaka, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 28 days.

(21) Appl. No.: 13/634,264

(22) PCT Filed: Nov. 22, 2011

(86) PCT No.: PCT/JP2011/076845
§ 371 (c)(1),
(2), (4) Date: Aug. 21, 2013

(87) PCT Pub. No.: WO2012/070550
PCT Pub. Date: May 31, 2012

(65) Prior Publication Data
US 2013/0325208 A1    Dec. 5, 2013

(30) Foreign Application Priority Data
Nov. 22, 2010  (JP) ................. 2010-260405

(51) Int. Cl.
*G05D 1/02*    (2006.01)
*E02F 9/20*    (2006.01)
*G05D 1/12*    (2006.01)

(52) U.S. Cl.
CPC .......... *G05D 1/0212* (2013.01); *G05D 1/12* (2013.01); *G05D 2201/021* (2013.01); *E02F 9/205* (2013.01); *G05D 1/0217* (2013.01); *G05D 2201/0202* (2013.01); *G05D 1/0278* (2013.01)

(58) Field of Classification Search
CPC .... E02F 9/205; G05D 1/0217; G05D 1/0212; G05D 1/0278; G05D 2201/0202; G05D 2201/021; G05D 1/12

USPC .......... 701/2, 25, 26, 50, 400, 408–411, 300; 340/988; 73/178 R
See application file for complete search history.

(56) References Cited

U.S. PATENT DOCUMENTS 6,044,312 A * 3/2000 Sudo et al. .............. 701/25
6,388,582 B2 * 5/2002 Yamashita et al. ......... 340/988
(Continued)

FOREIGN PATENT DOCUMENTS

JP    05-257529 A    10/1993
JP    08-263138 A    10/1996
(Continued)

OTHER PUBLICATIONS

The International Search Report of the International Searching Authority mailed Feb. 7, 2012 for the corresponding international application No. PCT/JP2011/076845 (with English translation).

*Primary Examiner* — Russell Frejd
(74) *Attorney, Agent, or Firm* — Posz Law Group, PLC

(57) ABSTRACT

Based on initial position information on an instructed fixed switch-back point and position information on a loading point, a relative positional relationship between the loading point and the switch-back point is generated. If the position of the loading point moves, then based on position information on the position-moved loading point, information on a direction of an unmanned vehicle at the loading point and information on a relative positional relationship, a new switch-back point is set at a position where the relative positional relationship can be maintained. When the initial position of the switch-back point is instructed, then on the basis of the initial position information on the switch-back point, a driving path leading to the loading point via the instructed switch-back point is generated and, when the position of the loading point moves, a driving path leading to the position-moved loading point via the new switch-back point is generated.

20 Claims, 14 Drawing Sheets

(56) References Cited

U.S. PATENT DOCUMENTS

| | | | |
|---|---|---|---|
| 6,502,016 B1* | 12/2002 | Ozaki et al. | 701/23 |
| 6,539,294 B1* | 3/2003 | Kageyama | 701/23 |
| 6,700,505 B2* | 3/2004 | Yamashita et al. | 340/988 |
| 7,228,227 B2* | 6/2007 | Speer | 701/467 |
| 7,602,480 B2* | 10/2009 | Romain et al. | 356/139.01 |
| 2010/0076640 A1* | 3/2010 | Maekawa et al. | 701/26 |
| 2010/0250022 A1* | 9/2010 | Hines et al. | 701/2 |
| 2010/0274431 A1 | 10/2010 | Matsunaga | |

FOREIGN PATENT DOCUMENTS

| | | |
|---|---|---|
| JP | 2008-97632 A | 4/2008 |
| JP | 2009-136995 A | 6/2009 |

* cited by examiner

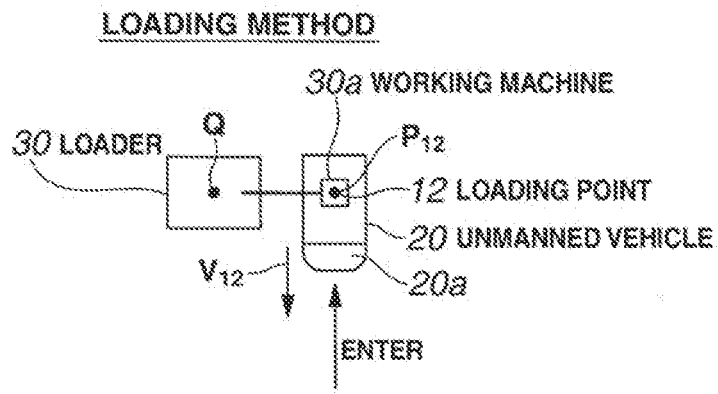
FIG.7A RIGHT LOADING
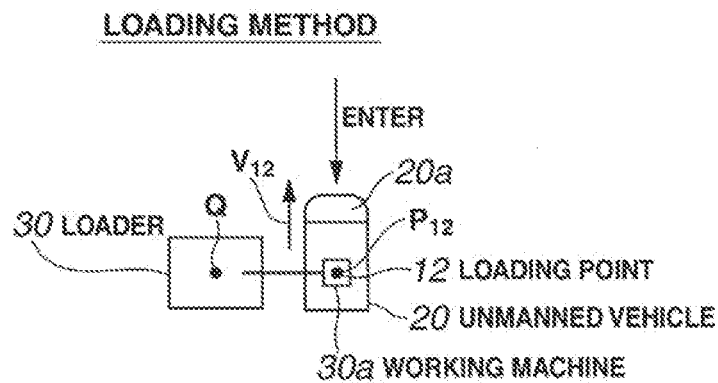
FIG.7B LEFT LOADING
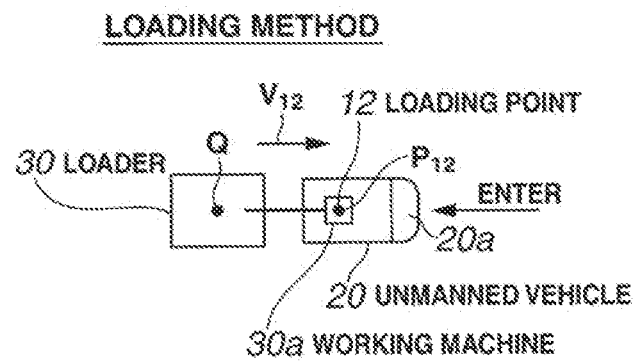
FIG.7C REAR LOADING
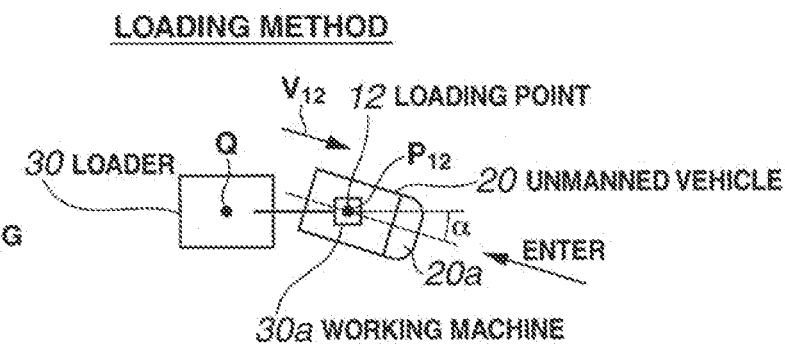
FIG.7D OBLIQUE LOADING

FINAL APPROACH

FINAL APPROACH

OBLIQUE LOADING

OBLIQUE LOADING

DRIVING SYSTEM OF UNMANNED VEHICLE AND DRIVING PATH GENERATION METHOD

CROSS REFERENCE TO RELATED APPLICATIONS

This application is a U.S. national stage application of PCT/JP2011/076845 filed on Nov. 22, 2011, and claims priority to, and incorporates by reference, Japanese Patent Application No. 2010-260405 filed on Nov. 22, 2010.

TECHNICAL FIELD

The present invention relates to a driving system of an unmanned vehicle that generates a driving path for the unmanned vehicle and drives the unmanned vehicle along the generated driving path to a target point, and a driving path generation method.

BACKGROUND ART

In a wide-area working site such as quarries and mines, vehicles for performing the carrying task of earth and sand are used. In performing the earth and sand carrying task, in order to avoid accidents due to fatigue of vehicle drivers (workers), to achieve manpower saving and to improve productivity by elongating working hours, there have been introduced unmanned vehicular driving systems for putting unmanned dump trucks in operation in place of manned vehicles such as manned off-road dump trucks.

In a working site where unmanned dump trucks are driven, there are areas such as a loading site, an earth unloading site and a fuelling station. These areas are connected by a well-maintained conveying road called a haul road, a lead-in road leading from the haul road to each of the areas called an access road and crossover points.

The loading site, which is one of the areas, is a place where an operation of loading earth and sand onto unmanned dump trucks (called "unmanned vehicles" in the present invention) is performed, and an excavation operation is performed by manned working vehicles (called "loaders" in the present invention) such as wheel loaders (front-end loaders), backhoes and shovels (for example, hydraulic shovels) and an operation of loading earth and sand onto unmanned vehicles.

FIG. 1A illustrates a loading site 1.

Referring to FIG. 1A, a driving path 10 is generated along which an unmanned vehicle 20 is caused to travel from an entry point 11 of the loading site 1 to a loading point 12 where a loader 30 exists, and the unmanned vehicle 20 is controlled to travel along the generated driving path 10. The loading point 12 is a position where earth and sand scooped by a bucket of a working machine 30a provided in the loader 30 are loaded in a load-carrying platform (also called a vessel) of the unmanned vehicle 20.

In this case, the unmanned vehicle 20 travels from the entry point 11 to arrive at the loading point 12 by way of a switch-back point 13 as a stopover point 14 located near the loading point 12. The switch-back point 13 is a point where switching between forward and reverse travels is performed at the time of switch-back operation that, after the unmanned vehicle 20 travels forward, it switches to a reverse travel to approach the loading point 12. But, the switch-back is not always required depending on loading patterns. For example, the vehicle 20 sometimes travels from the entry point 11 toward the loader 30 while describing an arc and exits the loading site 1.

Referring now to FIG. 1B, as the loader 30 such as a hydraulic shovel moves to a new excavation site or the like as the operator of the loader 30 operates to travel a traveling body (lower traveling body comprised of caterpillar belts or tires) of the loader 30, the position of the loading point 12 is moved sequentially. Incidentally, the above phrase "a movement or the like" is used because a swivel of the working machine (such as the bucket) 30a sometimes moves the loading point 12 without any movement of the loader 30 itself. For example, the position of the loading point 12 sometimes moves without any movement of the loader 30, as the operator of the loader 30 operates to drive the upper rotating body of the loader 30a causing a change in the approach angle of the unmanned vehicle 20 relative to the loader 30, due to the swivel of the working machine. That is to say, the position of the loading point 12 moves when the loader 30 performs the following three actions.

1) Movement+swivel
2) Movement only
3) Swivel only

When the position of the loading point 12 moves, it is necessary to set a new switch-back point 13' generate a new driving path 10' (shown in dashed line in FIG. 1B) to and make the unmanned vehicle 20 travel along the driving path 10' to guide the unmanned vehicle 20 to a new loading point 12'. That is to say, the unmanned vehicle 20 needs to travel from the entry point 11 to the new loading point 12' in the loading site 1 by a distance as short as possible to thereby improve production efficiency, realize low fuel consumption and suppress the cost.

(Conventional Working Technology)

According to a conventional unmanned vehicle driving system, when the position of the loading point 12, the direction of the unmanned vehicle 20 at the loading point 12, the entry point 11 of the loading site 1, and information on a boundary line 1A of the area of the loading site 1 are given, a supervising device 40 described later and shown in FIG. 5 searches automatically for a position of the switch-back point 13 and generates automatically the driving path 10 leading from the entry point 11 to the loading point 12 via the switch-back point 13.

(Prior Art 1 in Patent Documents)

The patent document 1 discloses an invention in which a circular course where an unmanned dump truck travels circularly is formed in a loading site and, when the position of a loading point moves, an approaching course, which is in contact with a vehicle stop position (switch-back point) on the circular course at a predetermined swivel radius and leads to the moved loading point, is automatically generated by computing, the unmanned dump truck traveling along the circular course is stopped at the vehicle stop position (switch-back point) and caused to perform a reverse travel to the loading point along the approaching course of the circular course (especially paragraphs 0012 through 0014 and FIG. 1 and FIG. 4 of the patent document 1).

(Prior Art 2 in Patent Documents)

The patent document 2 discloses an invention in which a predetermined drive pattern in a loading site is previously set and, when the position of a loading point moves, the position of a new loading point is determined by measuring or computing, and a driving path leading to the new loading point via a switch-back point is generated according to a previously set drive pattern (especially paragraph 0052 and FIG. 7 of patent document 2).

Patent document 1: Japanese Patent Application Laid-Open No. H05-257529 (especially paragraphs 0012 through 0014 and FIG. 1 and FIG. 4)

Patent document 2: Japanese Patent Application Laid-Open No. H08-263138 (especially paragraph 0052 and FIG. 7)

DISCLOSURE OF THE INVENTION

Problems to be Solved by the Invention

According to the prior art, the position of the switch-back point 13 is automatically determined by the unmanned vehicle driving system.

But, the switch-back point 13 automatically determined by the unmanned vehicle driving system is not necessarily the most appropriate point for the loading operation of the loader 30, and it is occasionally desirable to change it to a point with a better workability in accordance with the preference of an operator of the loader 30.

And, if there is a restriction that a choice for a point which can be determined as the switch-back point 13 is limited because the loading site 1 is small, the position of the switch-back point 13 which is a solution of the computed result might not be determined (the solution is diverged and not converged) depending on the arithmetic processing performed by the unmanned vehicle driving system. In such a case, the switch-back point 13 can be set at the most appropriate point for the loading operation depending on the judgment by the operator of the loader 30.

For example, referring to FIG. 2, when it is necessary to secure a travel area B dedicated for the loader 30 in the vicinity of the face of the loading site 1, the operator of the loader 30 might want to set the switch-back point 13 at a desired point outside the travel area B. The travel area B may also be regarded as a range where the loader 30 can move.

Referring to FIG. 3, even when the loading site 1 is narrow and it is difficult to set the switch-back point 13 immediately before a midpoint between the entry point 11 and the loading point 12, the operator of the loader 30 can occasionally set the most appropriate switch-back point 13 at a point away from the loading point 12 by visually recognizing and judging the shape of the loading site 1.

But, on the other hand, it is troublesome and largely burdensome for the operator of the loader 30 to set a point by solely searching for the most appropriate switch-back point 13 every time the loading point 12 moves, and the workability is impaired conversely.

Incidentally, the production efficiency in the unmanned vehicle driving system depends on how an unmanned vehicle 20, which is next to perform the loading operation, is kept driving to the vicinity of the loading point 12 while the loader 30 is performing the loading operation onto the unmanned vehicle 20. If the unmanned vehicle 20, which performs the loading operation next, is caused to wait just before the entry point 11 of the loading site 1 which is far from the switch-back point 13 until a new driving path 10 is generated, and caused to enter the loading site 1 after the new driving path 10 was generated, the loader 30 cannot perform the loading operation continuously and a stop time (standby time) of the unmanned vehicle 20 becomes long, resulting in considerable lowering in the production efficiency of the working site. Here, the production efficiency means an efficiency of round-trip operation (cycle time) when the cargo collected at a quarry or the like from the loading site 1 is transported to another place by means of the unmanned vehicle 20. Especially, in a case where the plural unmanned vehicles 20 sequentially enter the loading site 1, the production efficiency is further lowered because the standby time accumulates. Therefore, it is desirable that the next unmanned vehicle 20 is driving to the vicinity of the switch-back point 13 while the loader 30 is performing the loading operation in order to improve the production efficiency of the working site.

The present invention has been made in view of the foregoing circumstances, and the first problem to be solved by the invention is to improve the workability of the operator of the loader 30 by making it possible to set the stopover point on the driving path including the switch-back point 13 at the most appropriate point in order to improve the workability of the loading operation and by eliminating a troublesome and burdensome work of the operator of the loader 30 to search for and set the stopover point such as the most appropriate switch-back point 13 every time the target point on the driving path 10 including the loading point 12 moves. And, even in a case where the stopover point such as the switch-back point 13 is set by the operator of the supervising device 40 of the unmanned vehicle driving system, the first problem to be solved is to improve the workability of the operator of the supervising device 40.

Similarly, the second problem to be solved by the present invention is to improve the production efficiency by making it possible to set the stopover point on the driving path including the switch-back point 13 at the most appropriate point in order to improve the workability and making it possible to cause the next unmanned vehicle 20 travel to the vicinity of the stopover point while the working vehicle including the loader 30 is operating at the target point including the loading point 12.

In the prior art 1, since the circular course must be formed in the loading site, it cannot be applied to a narrow loading site where the circular course cannot be formed. And, the vehicle stop position (switch-back point) is limited to be on the circular course, and thus, the switch-back point cannot always be set at the most appropriate point desired by the operator.

In the prior art 2, since the switch-back point is defined uniquely by the predetermined drive pattern, there is no space for the operator's judgment to get in.

Thus, the respective patent documents 1 and 2 have no suggestion about the object of the present invention that the stopover point such as switch-back point 13 can be set at the most appropriate point according to the operator judgment in order to improve workability.

Measures to Solve the Problem

The first invention is a driving system of an unmanned vehicle, which generates a driving path for the unmanned vehicle and causes to travel the unmanned vehicle along the generated driving path to a target point, characterized in that, the system comprises:
  stopover point instructing means which instructs initial position information on a stopover point, which is on a driving path and just before a target point, treated as a moving point which moves in position according to a position movement of the target point;
  relative positional relationship information generating means which generates information on a relative positional relationship between the target point and the stopover point on the basis of the initial position information on the stopover point instructed by the stopover point instructing means and position information on the target point;
  stopover point setting means which, when the position of the target point moves, sets a new stopover point at a position where the relative positional relationship can be maintained on the basis of position information on the position-moved target point, information on a direction of the unmanned vehicle at the position-moved target point, and the relative positional relationship information;

driving path generating means which, when the initial position of the stopover point is instructed by the stopover point instructing means, generates a driving path leading to the target point via the instructed stopover point on the basis of the initial position information on the stopover point and, when the position of the target point moves, generates a driving path leading to the position-moved target point via the new stopover point set by the stopover point setting means; and driving control means which causes the unmanned vehicle to travel along the driving path to the target point via the stopover point on the basis of the information on the generated driving path.

The second invention is a driving system of an unmanned vehicle, which generates a driving path for the unmanned vehicle and causes the unmanned vehicle to travel along the generated driving path to a target point, characterized in that, the system comprises:

stopover point instructing means which instructs initial position information of a stopover point, which is on a driving path and just before a target point, treated as a fixed point which does not move in position;

driving path generating means which, when a fixed position of the stopover point is instructed by the stopover point instructing means, generates a driving path leading to the target point via the instructed stopover point on the basis of the fixed position information on the stopover point, position information on the target point, and information on a direction of the unmanned vehicle at the target point and, when the position of the target point moves, generates a driving path leading to the position-moved target point via the stopover point on the basis of the position information on the position-moved target point, the information on the direction of the unmanned vehicle at the position-moved target point, and the fixed position information on the stopover point; and driving control means which causes the unmanned vehicle to travel along the driving path to the target point via the stopover point on the basis of the information on the generated driving path.

The third invention is characterized in that, in the first or second invention, the unmanned vehicle is a dump truck, the stopover point is a switch-back point, and the target point is a loading point where a loader as a working vehicle exist.

The fourth invention is characterized in that, in the third invention, the driving path is a path leading from an entry point of the loading site to the loading point in an area of a loading site via the switch-back point in the area of the loading site.

The fifth invention is characterized in that, in the third invention, the driving path includes a path just before the entry point of the loading site, and the switch-back point is instructed and set outside the area of the loading site and just before the entry point.

The sixth invention is characterized in that, in the first through fifth inventions, the stopover point instructing means is provided in the working vehicle existing at the target point.

The seventh invention is characterized in that, in the first through fifth inventions, the stopover point instructing means is provided in a supervising device capable of communicating with the unmanned vehicle and a working vehicle existing at the target point by means of communication means.

The eighth invention is a driving path generation method for an unmanned vehicle, which generates a driving path leading to a target point of the unmanned vehicle, characterized by:

Instructing initial position information of a stopover point, which is on a driving path and just before a target point, treated as a moving point which moves in position according to a position movement of the target point;

when the initial position of the stopover point is instructed, generating a driving path leading to the target point via the instructed stopover point on the basis of the initial position information on the stopover point, and generating information on a relative positional relationship between the target point and the stopover point on the basis of the initial position information on the instructed stopover point and position information on the target point; and when the position of the target point moves, generating a new stopover point at a position where the relative positional relationship can be maintained on the basis of position information on the position-moved target point, information on a direction of the unmanned vehicle at the position-moved target point, and the relative positional relationship information, and generating a driving path leading to the position-moved target point via the newly set stopover point.

The ninth invention is a driving path generation method for an unmanned vehicle, which creates generates a driving path leading to a target point of the unmanned vehicle, characterized by:

Instructing position information of a stopover point, which is on a driving path and just before a target point, treated as a fixed point which does not move in position;

when a fixed position of the stopover point is instructed, generating a driving path leading to the target point via the instructed stopover point on the basis of the fixed position information on the stopover point, position information on the target point, and information on a direction of the unmanned vehicle at the target point; and when the position of the target point moves, generating a driving path leading to the position-moved target point via the stopover point on the basis of the position information on the position-moved target point, the information on a direction of the unmanned vehicle at the position-moved target point, and the fixed position information on the stopover point.

Effect of the Invention

The unmanned vehicle according to the present invention includes a delivery vehicle such as a dump truck and includes both a delivery vehicle traveling outdoors and a delivery vehicle traveling indoors. The stopover point is a point on a driving path just before the target point and includes both a point such as a switch-back point where the unmanned vehicle stops and performs switch back operation and a passing point where the unmanned vehicle passes through without stopping. The target point includes both a point where a working vehicle exists and a point where a working vehicle does not exist. The working vehicle includes a loader at the loading site, an earth moving machine at the earth unloading site, and a fuel truck at the fuelling station.

According to the first invention or the eighth invention, the stopover point can be instruct and set, by the stopover point instruction means, at the most appropriate point where the operator can improve workability. Once the stopover point is set, a new stopover point is set automatically at the position where the relative positional relationship between the target point and the stopover point can be maintained even if the target point moves. Therefore, a troublesome and burdensome work to search for by oneself and instruct the most appropriate point each time the target point moves, is unnecessary and workability is improved.

According to the second invention or the ninth invention, the stopover point can be instruct and set, by the stopover point instruction means, at the most appropriate point where the operator can improve workability, similarly in the first invention or the eighth invention. Once the stopover point is instructed, the driving path is generated while the position of the stopover point remains fixed even if the target point moves, and thus, the driving path to the stopover point is fixed, and the next unmanned vehicle can travel to the vicinity of the stopover point. As a result, production efficiency of the working site is improved dramatically.

BEST MODE FOR CARRYING OUT THE INVENTION

Exemplary embodiments of the driving system of an unmanned vehicle and the driving path generation method according to the present invention will be described below with reference to the accompanying drawings. Incidentally, in the exemplary embodiments, it is assumed that unmanned vehicles are unmanned off-road dump trucks. It is also assumed that working vehicles for performing operations with the unmanned vehicles are loaders such as manned shovels, manned backhoes, manned wheel loaders, and manned excavators. Needless to say, the present invention can be applied not only to the loaders but also to the working vehicles such as an earth moving machine like a bulldozer or a wheel dozer, etc. in the earth unloading site and fuel trucks such as a tanker in the fuelling station.

FIG. 4 is a view of the loading site 1 from above. A working site includes such areas as a loading site, an earth unloading site, a fuelling station and a vehicle parking lot. These areas are connected by a well-maintained conveying road called a haul road, a lead-in road called an access road leading from the haul road to each of the areas and crossover points.

The loading site 1, which is one of the areas, is a place where an operation of loading earth and sand onto an unmanned vehicle 20 is performed. In the loading site 1, an excavation operation and an operation of loading earth and sand onto the unmanned vehicle 20 by a loader 30 such as a wheel loader, a backhoe, a shovel and an excavator are performed.

Details of the generation of the driving path 10 are described later. The unmanned vehicle 20 is guided to travel along a driving path 10 from an entry point 11 to a loading point 12 where a manned loader 30 exists in the loading site 1. The driving path 10 is comprised of a variety of information for driving the unmanned vehicle 20. The driving path 10 has, as main information, route coordinate data showing a position of the unmanned vehicle 20 traveling along the path. The route coordinate data is a set of sequences of points. And, the driving path 10 also includes stop position coordinate data showing a stop position of the unmanned vehicle 20 at a particular position on a path correlated with the route coordinate data and speed limit value data on a path correlated with the route coordinate data. The unmanned vehicle 20 reads successively the route coordinate data, the stop position coordinate data, and speed limit value data from a memory device 34 while driving to perform engine outputting, braking and steering according to respective data, and performs driving, stopping and swiveling. The loading point 12 becomes a target point where the unmanned vehicle 20 performs a loading operation. Here, the entry point 11 is a predetermined point where the haul road for the unmanned vehicle 20 to travel and the loading site 1 intersect mutually. Incidentally, as will be described later, a stopover point 14 is set between the entry point 11 and the loading point 12 according to the instruction of the operator of the loader 30. For example, a switch-back point 13 is determined as the stopover point 14. The switch-back point 13 is a point where the unmanned vehicle 20 stops and changes its travel direction from forward travel to reverse travel (make switch back). In addition, a passing point 16 where the unmanned vehicle 20 passes through without stopping is also included in the stopover point 14 as described later. Hereinafter, the stopover point 14 is regarded as the switch-back point 13 unless otherwise specified.

The driving path 10 is a path along which the unmanned vehicle 20 travels and which extends from the entry point 11 to the loading point 12 by way of the switch-back 13 located in the vicinity of the loading point 12. In the driving path 10, a driving path from the switch-back point 13 to the loading point 12 is called "final approach 10a", and a driving path from the entry point 11 to the switch-back point 13 is called "first half 10b of the driving path".

The driving path 10 is generated based on the information on a position P12 at the loading point 12, a direction V12 of the unmanned vehicle 20 at the loading point 12, the position information on the entry point 11, and the information on a position P13 at the switch-back point 13, by a supervising device 40 shown in FIG. 5. Incidentally, in the case where plural driving paths 10 are generated at different times, one first and another later, the driving path generated later is denoted by attaching a dash (') to reference numeral 10 in order to differentiate from each other.

That is to say, the unmanned vehicle 20 is guided to travel along the driving path 10 received from the supervising device 40. The unmanned vehicle 20 travels along the driving path 10 while adjusting the speed by performing engine output control and brake control and further travels along the driving path 10 while performing swivel control of a steering angle of wheels. As a result, the unmanned vehicle 20 enters the loading site 1 from the entry point 11, travels toward the switch-back point 13, performs a switch-back at the switch-back point 13, and stops at a point which is the loading point 12. The operator of the loader 30 performs such as operating a lever in the cab to operate a working machine 30a, and earth and sand (cargo) are loaded by the working machine (bucket) 30a of the loader 30 onto the load-carrying platform of the unmanned vehicle 20. After the unmanned vehicle 20 finishes the loading operation at the loading point 12, the operator of the loader 30 performs a prescribed operation to send a prescribed signal (indicating the completion of loading, the readiness to start, and the like) to the unmanned vehicle 20. After the unmanned vehicle 20 has received the prescribed signal from the loader 30, the unmanned vehicle 20 travels to an exit point 15 of the loading site 1.

The unmanned vehicle 20 is a front-wheel steering vehicle provided with a driver's seat (cab) 20a at a front portion of the vehicle body, a load-carrying platform (vessel) at a rear portion of the vehicle body, and front and rear wheels.

The travelling direction of the unmanned vehicle 20 changes from forward travel direction to reverse travel direction before and after the switch-back point 13. The unmanned vehicle 20 performs reverse travel toward the loading point 12 and enters there.

When the position of the loading point 12 moves, a new driving path 10' (shown in dashed line) extending from the entry point 11 to the position-moved loading point 12' is generated. A switch-back point 13' on the driving path 10' generated later according to the position movement of the loading point 12 is located at a position different from the switch-back point 13 on the first-generated driving path 10. But, a relative positional relationship A between the loading point 12 before the position movement and the first-generated switch-back point 13 is maintained as described later. In the driving path 10', the driving path from the later-generated switch-back point 13' to the loading point 12' after the position movement is defined as a "final approach 10'*a*", and the driving path extending from the entry point 11 to the later-generated switch-back point 13' is defined as a "first half 10'*b* of the driving path".

Incidentally, in order to differentiate between the loading points before and after the position movement, the loading point after the position movement is denoted by attaching a dash (') to reference numeral 12 as stated above. In the same manner, in order to differentiate between the first-generated switch-back point and the later-generated switch-back point, the later-generated switch-back point is denoted by attaching a dash (') to reference numeral 13 as described above. FIG. 5 shows a block diagram of an unmanned vehicle driving system of an exemplary embodiment. In the case where plural unmanned vehicles 20 travel in the loading site 1, a dash (') is attached to the reference numeral 20 in order to differentiate one unmanned vehicle from another.

In the working site, there is provided a supervising device 40 for supervising and monitoring a large number of unmanned vehicles 20, 20' . . . . The supervising device 40 is provided with a communication device 41, a processing device 42, an input device 43, a memory device 44 and a display device 45.

On the other hand, the unmanned vehicles 20 and 20' are respectively provided with a communication device 21, a processing device 22, a position measuring device 23, a control device 24 and a memory device 25.

The loader 30 is provided with a communication device 31, a processing device 32, an input device 33, a memory device 34, a position measuring device 35, and a display device 36.

The communication device 21 is comprised of an antenna, a transmitter, and a receiver, etc. for wireless communication. The processing device 22 is comprised of a numerical data processor such as CPU and memories such as ROM and RAM. In addition, the memory device 25 is comprised of memories such as ROM and RAM, and a memory medium such as a USB memory in and from which data can be written and read. And, the memory device 25 may be a memory device such as a hard disk having high vibration resistance. The control device 24 is a controller for performing engine output control, steering angle control of front wheels, braking amount control of brakes, and the like, of the unmanned vehicles 20, 20', and comprised of a numerical data processor such as CPU and memories such as ROM and RAM. The position measuring device 23 mounted in each of the unmanned vehicles 20, 20' measures its vehicle position. As means for position measurement, for example, a tire revolution number sensor and a gyroscope provided in the unmanned vehicles 20, 20' are used. The position of the vehicle is measured based on the output signal of the tire revolution number sensor and the output signal of the gyroscope. Alternatively, the position of the vehicle may be measured by receiving signals transmitted from a GPS satellite by a GPS antenna, and then detecting by a GPS sensor.

The position information on the unmanned vehicles 20, 20' measured by the unmanned vehicles 20, 20' is processed by the processing device 22 so that it can be transmitted as communication data and is transmitted to the supervising device 40 and the loader 30 through the communication device 21. Otherwise, the position information on the unmanned vehicles 20, 20' may be once transmitted to the supervising device 40 via the wireless device 21, and then transmitted to the loader 30 via the communication device 41 of the supervising device 40.

The communication device 41 of the supervising device 40 is comprised of an antenna, a transmitter, and a receiver, etc. for wireless communication. The processing device 42 is comprised of a numerical data processor such as CPU and memories such as ROM and RAM. In addition, the memory device 44 is comprised of memories such as ROM and RAM, a memory medium such as a USB memory in and from which data can be written and read, and a memory device such as a hard disk. The display device 45 is formed of a display device, such as a liquid crystal monitor, which is provided with an audio output function. The input device 43 is comprised of a keyboard and a pointing device such as a touch panel, a pen tablet and a mouse. Incidentally, the display device 45 and the input device 43 may have an integral structure or individual structures. The display device 45 may have a various information input function of the input device 43. The display device 45 may be a device having both a various information input function and a various information display function such as a touch panel.

The communication device 41 of the supervising device 40 receives position information transmitted from plural unmanned vehicles 20, 20' . . . with the use of wireless communication means such as a wireless LAN (local area network). The received position information is used for supervising and monitoring the plural unmanned vehicles 20, 20' and for generating the driving paths 10, 10'.

Since the loader 30 such as a shovel conducts a movement or the like to a new excavation site depending on the state of earth and sand, which become cargo, in the loading site 1 according to the operation by the operator of the loader 30, its loading point 12 changes successively.

Incidentally, the reason why the above phrase, "a movement . . . or the like" is used is that there is an occasion in which the position of the loading point 12 that is determined by the operator of the loader 30 is changed as the working machine (bucket) swivels while the loader 30 itself is unmoved by the operator of the loader 30 who operates the operation lever and the like in the cab to swivel (or expand and contract) the working machine (bucket) 30*a*.

The communication device 31 of the loader 30 is comprised of an antenna, a transmitter, and a receiver for wireless communication. The processing device 32 is comprised of a numerical data processor such as CPU and memories such as ROM and RAM. In addition, the memory device 34 is comprised of memories such as ROM and RAM, a memory medium such as a USB memory in and from which data can be written and read, and a memory device such as a hard disk. The display device 36 is formed of a display device, such as a liquid crystal monitor, which is provided with an audio output function. The input device 33 is comprised of a keyboard and a pointing device such as a touch panel, a pen tablet and a mouse. Incidentally, the display device 36 and the input device 33 may have an integral structure or individual structure The display device 36 may be one having the various information input functions of the input device 33. The display device 36 may be formed of a touch panel as described later. The position measuring device 35 of the loader 30 uses a global positioning system represented by GPS (global positioning system) to measure position Q of its own loader 30. Signals from a GPS satellite are received by the GPS sensor to measure its own position. The processing device 32 is comprised of a numerical data processor such as CPU and memories such as ROM and RAM. When the loader 30 is, for example, a shovel, the processing device 32 measures a position P12 of the loading point 12 on the basis of the measured position Q of the loader 30 of its own, a swivel angle θ of the working machine 30a, data on the dimensions of respective portions of the vehicle body and the working machine 30a, and the like. The data on the dimensions of the respective portions of the working machine 30a has been stored previously in the memory device 34. When the loader 30 is, for example, a shovel, the swivel angle θ is determined by measuring a relative positional relationship between the lower traveling body and the upper rotating body by a swivel angle sensor such as a potentiometer or a resolver.

When the position of the loading point 12 is initialized or the position of the loading point 12 is moved, the operator of the loader 30 operates manually the input device 33 to instruct the setting of the position P12 of the loading point 12. This manual operation will be described in detail later. According to the instruction, a signal instructing the position setting of the loading point 12 is outputted from the input device 33 to the processing device 32. According to the output of the signal, the current position Q of the loader 30, data on the dimensions for the respective portions of the working machine 30a, and the swivel angle θ of the current working machine 30a are taken into the processing device 32, in which the current position P12 of the loading point 12 is computed. And, the operator of the loader 30 operates manually the input device 33 to instruct a loading method, and information of the loading method is outputted to the processing device 32. Respective loading methods are allocated to plural buttons configuring the input device 33, and when any of the buttons of the input device 33 is depressed, information showing the loading method corresponding to the depressed button is outputted from the input device 33.

The information on the current position Q of the loader 30, the information on the current position P12 of the loading point 12 and the information on the loading method are stored in the memory device 34.

On the basis of the current position Q of the loader 30, the current position P12 of the loading point 12 and the instructed loading method, a direction V12 (hereinafter, called the loading point direction V12) of the unmanned vehicle 20 at the loading point 12 can be determined A specific method of determining the loading point direction V12 is described later.

FIGS. 7A, 7B, 7C and 7D illustrate various loading methods.

FIG. 7A shows right loading. In the case of right loading, the unmanned vehicle 20 enters (approaches) in reverse travel from the right side perpendicular with respect to the longitudinal direction of the working machine 30a. Therefore, the loading point direction V12 is defined uniquely by the current position Q of the loader 30, the current position P12 of the loading point 12 and the instructed loading method called "right loading".

FIG. 7B shows left loading. In the case of left loading, the unmanned vehicle 20 enters (approaches) in reverse travel from the left side perpendicular with respect to the longitudinal direction of the working machine 30a.

Therefore, the loading point direction V12 is defined uniquely by the current position Q of the loader 30, the current position P12 of the loading point 12 and the instructed loading method called "left loading".

FIG. 7C shows rear loading. In the case of rear loading, the unmanned vehicle 20 enters (approaches) in reverse travel from a direction corresponding with the longitudinal direction of the working machine 30. Therefore, the loading point direction V12 is defined uniquely by the current position Q of the loader 30, the current position P12 of the loading point 12 and the instructed loading method called "rear loading".

FIG. 7D shows oblique loading. In the case of oblique loading, the unmanned vehicle 20 enters (approaches) in reverse travel from a direction inclined by a preset inclination angle α with respect to the longitudinal direction of the working machine 30a. Therefore, the loading point direction V12 is defined uniquely by the current position Q of the loader 30, the current position P12 of the loading point 12 and the instructed loading method called "oblique loading".

The example of FIG. 4 illustrated above shows the case where the left loading is instructed as the loading method. The example of FIG. 4 illustrated above shows the case where the left loading method is instructed.

The loading point direction V12 is calculated by the processing device 32 of the loader 30. The information on the current loading point direction V12 is stored in the memory device 34 of the loader 30.

The information on the current position Q of the loader 30 stored in the memory device 34, the information on the current position P12 of the loading point 12 and the information on the current loading point direction V12 are transmitted to the supervising device 40 via the communication device 31.

Incidentally, a position of the loading point 12' after the position change from the current position P12 of the loading point 12 is determined as "P'12".

The communication device 41 of the supervising device 40 receives the information on the current position Q of the loader 30, the information on the current position P12 of the loading point 12 and the information on the current loading point direction V12, which were transmitted from the loader 30. The received information on the current position Q of the loader 30, the information on the current position P12 of the loading point 12 and the information on the current loading point direction V12 are used for supervising and monitoring the loader 30 and for generating the driving paths 10, 10'.

The input device 43 of the supervising device 40 is used to input known "terrain information" on the loading site 1 required for generating the driving paths 10, 10' such as a boundary line 1A of the loading site 1 where the unmanned vehicles 20, 20' are to travel, the position of the entry point 11 and the directions of the unmanned vehicles 20, 20' at the entry point 11. The terrain information consists of data of space coordinate values, and it was obtained by a work of previously causing to travel a measurement vehicle having various measuring equipments such as a distance sensor in the working site to obtain the terrain information.

This terrain information is transmitted to the loader 30 via the communication device 41 of the supervising device 40.

The communication device 31 of the loader 30 receives the terrain information transmitted from the supervising device 40. The received terrain information is stored in the memory device 34. The above descriptions are common to respective embodiments described below.

First Embodiment

FIGS. 6A, 6B and 6C are flow charts showing the processing according to a first embodiment. Explanation will be made below with reference to the flowchart of FIG. 6 together with FIG. 4. FIG. 6A shows a flow executed by the loader 30 and the supervising device 40 and constituting a part of this embodiment. And, FIG. 6B shows a flow executed by the loader 30 and the supervising device 40 and constituting a part of this embodiment. FIG. 6C shows a flow executed by the unmanned vehicle 20 and the supervising device 40 and constituting a part of this embodiment.

The operator of the loader 30 operates manually the input device 33 to instruct an initial position P13 of the switch-back point 13, and initializes the position P13 of the switch-back point 13. According to this instruction, the information on the initial position P13 of the switch-back point 13 is input from the input device 33, and a signal showing that the switch-back point 13 has been initialized is input. The input device 33 configures stopover point (switch-back point) instruction means. A specific structure and the like of the input device 33 will be described later and, for example, the operator of the loader 30 instructs the initial position P13 of the switch-back point 13 by touching to depress any position on the map shown in the screen of the input device 33 which is formed of a touch panel. Information on the position corresponding to the touched position is outputted as a signal showing, that the switch-back point 13 has been initialized, to the processing device 32.

When the signal showing that the switch-back point 13 has been initialized is inputted, the processing device 32 of the loader 30 generates information on the relative positional relationship A between the loading point 12 and the switch-back point 13 on the basis of the initial position P13 of the switch-back point 13 and information on the initial position P12 of the loading point 12. The processing device 32 configures relative positional relationship information generating means (step 101). The relative positional relationship A is a relationship of a relative position to the loading point 12 of the switch-back point 13 in a virtually determined XY coordinate system with the position of the initial position P12 of the loading point 12 determined as the origin. Since the X-axis direction of the XY coordinate system is oriented when the loading method is instruct, the direction shown by the X-axis direction agrees with the direction of the loading point V12.

The information on the initial position P13 of the switch-back point 13 and the information on the relative positional relationship A are stored in the memory device 34 (step 102).

The information on the initial position P13 of the switch-back point 13 is transmitted to the supervising device 40 via the communication device 31. The communication device 41 of the supervising device 40 receives the information on the initial position P13 of the switch-back point 13 (step 103).

When an instruction to set the initial position P12 of the loading point 12 is made by the loader 30 (step 201), the initial position P12 of the loading point 12 is determined. The information on the initial position Q of the loader 30 and the information on the loading point direction V12 at the initial position P12 of the loading point 12 are transmitted to the supervising device 40 via the communication device 31. Incidentally, the information on the initial position P13 of the switch-back point 13 is transmitted to the supervising device 40 via the communication device 31 in step 103 (step 202).

The processing device 42 of the supervising device 40 receives these information via the communication device 21. The processing device 42 generates the driving path 10 leading to the loading point 12 via the switch-back point 13 on the basis of these information, namely the information on the initial position P13 of the switch-back point 13, the information on the initial position P12 of the loading point 12, and the information on the loading point direction V12, and furthermore, the terrain information, and the information on the current position of the unmanned vehicle 20. The driving path 10 is generated as a path leading from the entry point 11 to the loading point 12 via the switch-back point 13 on which the unmanned vehicle 20 travels without departing from the area of the loading site 1 and without interfering with any obstacles such as the loader 30. The processing device 42 configures the driving path generating means. The generated driving path 10 is stored in the memory device 44 (step 203).

A driving path requesting instruction is automatically transmitted from the unmanned vehicle 20 to the supervising device 40 via the communication device 21 (step 301).

When the driving path requesting instruction is received by the communication device 41 of the supervising device 40 and the memory device 44 does not have the information on the driving path 10, the information on the driving path 10 is not transmitted to the unmanned vehicle 20 until the driving path 10 is generated (step 302), but, when the driving path 10 is generated and the memory device 44 has the information on the driving path 10, the information on the driving path 10 is transmitted to the unmanned vehicle 20 via the communication device 41. And, the information on the driving path 10 is also transmitted to the loader 30 (step 303).

The communication device 21 of the unmanned vehicle 20 receives the information on the driving path 10 transmitted from the supervising device 40. The information on the driving path 10 transmitted from the supervising device 40 is stored in the memory device 25. The processing device 22 of the unmanned vehicle 20 generates a control instruction for driving and steering its own unmanned vehicle 20 on the basis of the information on the driving path 10. As described above, the driving path 10 also includes stop position coordinate data showing the stop position of the unmanned vehicle 20 at a particular position on the path correlated with the route coordinate data and speed limit value data of the path correlated with the route coordinate data, and the control orders are created generated on the basis of such data. Such control orders are outputted to the control device 24. As a result, the control device 24 controls the driving and steering of its own unmanned vehicle 20, and the unmanned vehicle 20 performs acceleration and deceleration driving, changing of forward and reverse driving, stopping at predetermined positions, and swivel steering driving, along the driving path 10 (step 304; FIG. 4).

Here, it is assumed that the loader 30 moves when the lower traveling body of the loader 30 is driven by operation by the operator of the loader 30.

When the operator of the loader 30 instructs the setting of the position P'12 of a next loading point 12', the position P'12 of the next loading point 12' and a next loading point direction V'12 are determined according to the instruction. On the basis of the information on the position P'12 of the next loading point 12', the information on the next loading point direction V'12, and the information on the relative positional relationship A, the processing device 32 performs processing to set a new switch-back point 13' at a position where the relative positional relationship A can be maintained and to compute the position P'13 of the new switch-back point 13'. The processing device 32 configures stopover point setting means. The information on the position P'13 of the new switch-back point 13' is stored in the memory device 34 (step 201).

The information on a next position Q' of the loader 30, the information on the position P'12 of the next loading point 12, the information on the loading point direction V'12 at the loading point 12 and the information on the position P'13 of the new switch-back point 13', which are stored in the memory device 34, are transmitted to the supervising device 40 via the communication device 31 (step 202).

When such information is received via the communication device 41, the processing device 42 of the supervising device 40 generates a new driving path 10' leading to the loading point 12' after the position movement via the new switch-back point 13' on the basis of such information, namely the information on the position P13 of the new switch-back point 13', the information on the position P'12 of the next loading point 12', and the information on the loading point direction V'12 at the loading point 12', and furthermore, the terrain information, and the information on the current position of the next unmanned vehicle 20'. The new driving path 10' is created as a path leading from the entry point 11 to the next loading point 12' via the new switch-back point 13' on which the unmanned vehicle 20 travels without departing from the area of the loading site 1 and without interfering with any obstacles such as the loader 30. The processing device 42 configures the driving path generating means. The generated new driving path 10' is stored in the memory device 44 (step 203).

A driving path requesting instruction is automatically transmitted from the next unmanned vehicle 20' (hereinafter, called the next unmanned vehicle 20') which enters the loading site 1 following the unmanned vehicle 20, to the supervising device 40 via the communication device 21 of the unmanned vehicle 20' (step 301). The driving path requesting instruction is transmitted to the supervising device 40 at a predetermined time interval or at timing that the unmanned vehicle 20 has reached or passed through a particular point in the working site.

When the driving path requesting instruction is received by the communication device 41 of the supervising device 4 and the memory device 44 does not have the information on the new driving path 10', the information on the new driving path 10' is not transmitted to the next unmanned vehicle 20' until the new driving path 10' is generated (step 302), but, when the new driving path 10' is generated and the memory device 44 has the information on the new driving path 10', the information on the new driving path 10' is transmitted to the next unmanned vehicle 20' via the communication device 41. And, the information on the new driving path 10' is also transmitted to the loader 30 (step 303).

The communication device 21 of the next unmanned vehicle 20' receives the information on the new driving path 10' transmitted from the supervising device 40. The information on the new driving path 10' transmitted from the supervising device 40 is stored in the memory device 25. The processing device 22 of the next unmanned vehicle 20' generates a control instruction for driving and steering its own unmanned vehicle 20' on the basis of the information on the new driving path 10'. These control orders are outputted to the control device 24. As a result, the control device 24 controls the driving and steering of its own unmanned vehicle 20', and the next unmanned vehicle 20' is driven and steered along the new driving path 10' (step 304; FIG. 4).

In the same manner, each time the position of the loading point 12' is changed, the relative positional relationship A is used to set a new switch-back point 13', a new driving path 10' is generated, and the next unmanned vehicle 20' is controlled to travel along the new driving path 10'.

In a case where the operator of the loader 30 desires to set again the switch-back point 13 at the operator's preferred position, the operator depresses a particular button on the input device 33 to reset the relative positional relationship A stored in the current memory device 34. That is to say, a processing is performed from the step 101 of FIG. 6A. It is sufficient that the operator of the loader 30 operates manually the input device 33 to instruct the initial position P13 of the switch-back point 13.

Second Embodiment

A second embodiment will now be described with additional reference to FIG. 8 and FIG. 9. In the second embodiment, it is assumed that a right loading shown in FIG. 7A is instructed as a loading method.

FIGS. 8A and 8B are views showing structure examples of the input device 33 and the display device 36 of the loader 30, and FIG. 9 is a flow chart showing a processing procedure of the second embodiment corresponding to the structure examples of FIGS. 8A and 8B.

That is to say, a touch-panel GUI (graphical user interface) device 38 which is integral with the input device 33 and the display device 36 is provided inside the cab of the loader 30 as shown in FIGS. 8A and 8B. Buttons 38A which function as the input device 33 and a display portion 38B which functions as the display device 33 are arranged on the display screen of the touch panel GUI device 38. The touch panel GUI device 38 can input various commands by touching and depressing the buttons 38A which are, for example, of a resistive film system or a capacitive sensing method. The display portion 38B shows the boundary line 1A in the loading site 1 on the basis of the terrain information stored in the memory device 34. A screen coordinate position at any point on the display portion 38B corresponds to an absolute coordinate position of a point corresponding to the actual loading site 1.

The current position Q of the loader 30 and the current position P12 of the loading point 12 stored in the memory device 34 are shown together with icons showing the loader 30 and the working machine 30a on the display portion 38B.

Here, in order to designate any position on the map shown on the screen of the display portion 38B as the switch-back point 13, the operator of the loader 30 directly touches the screen with a finger to output information on screen position coordinates to the memory device 34 or the processing device 32. At this time, if the operator desires to make setting by finely adjusting the position of the switch-back point 13 according to the operator's preference, the operator touches and depresses the buttons 38A to input a command "to move the switch-back point 13 on the display portion 38B". Specifically, moving directions of the switch-back point 13 on the display portion 38B, such as "left", "right", "up" and "down" are allotted to the respective buttons 38A. For example, when the button 38A to which "left" is allotted is depressed by the operator, the switch-back point 13 designated on the display portion 38B moves in the left direction as viewed from the operator. The movement amount of the switch-back point 13 is determined according to the number of times of depressing or a duration of continuous depressing of the button 38A. Such operations causes to move the switch-back point 13 to the desired position on the display portion 38B. When the switch-back point 13 is located at the desired position on the display portion 38B, the buttons 38A are touched and depressed to input a command "to determine the position of the switch-back point 13". Thus, the initial position P13 of the switch-back point 13 is instructed, and the information on the initial position P13 of the switch-back point 13 is stored in the memory device 34 (step 501).

Then, when the initial position P13 of the switch-back point 13 is instructed, the processing device 32 of the loader 30 generates information on the relative positional relationship A between the loading point 12 and the switch-back point 13 on the basis of the information on the initial position P13 of the switch-back point 13 and the information on the initial position P12 of the loading point 12, and the information on the relative positional relationship A is stored in the memory device 34.

On the basis of the initial position P13 of the switch-back point 13, the information on the initial position P12 of the loading point 12, and the information on the loading point direction V12 at the loading point 12, the processing device 32 generates final approach 10*a* leading from the switch-back point 13 to the loading point 12 and shows a trajectory (driving path that the unmanned vehicle 20 is scheduled to travel) of the generated final approach 10*a* together with an icon showing the unmanned vehicle 20 on the display portion 38B.

Here, processing to generate the final approach 10*a* is described with reference to FIG. 10A.

As shown in FIG. 10A, the processing device 32 generates information that the position coordinates (xE, yE) of the switch-back point 13 which are defined by the relative positional relationship A (position coordinates (xE, yE) of the switch-back point 13 with respect to coordinate origin (0, 0)) are plotted on the x-y coordinate having the loading point 12 as the origin and the x-axis plus direction as the loading point direction V12.

For example, the final approach 10*a* is defined uniquely if the following conditions are given for generating the final approach 10*a*:
a) linear distance (s) from the switch-back point 13 is needed, and
b) final approach 10*a* is formed of one arc and a line segment having a length(s).

That is to say, the final approach 10*a*, that leads by the linear distance(s) from the switch-back point 13 (xE, yE) in a direction intersecting with the x-axis at an angle θE and then reaches the loading point 12 along the arc, is determined by geometric calculation. On the basis of coordinate values of the instructed loading point 12, coordinate values of the instructed switch-back point 13, the straight line originating from the predetermined switch-back point 13 and the XY coordinate system that is determined by the selected loading method, the geometric calculation determines a radius r whose arc is in contact with a linear S, and the intersection angle θE between the X axis and the extended line at a point where the X axis and the linear S extended to the X axis intersect. Thus, the final approach 10*a* is determined And, a direction V13 of the unmanned vehicle 20 at the switch-back point 13 is determined according to the determined angle θE. And, the relative positional relationship A between the loading point 12 and the switch-back point 13 is also determined (step 502; FIG. 8A).

FIG. 10A illustrates a case where an operation is automatically performed on the direction V13 of the unmanned vehicle 20 at the switch-back point 13 under predetermined conditions, and it is also possible to instruct the direction V13 of the unmanned vehicle 20 at the switch-back point 13 as a direction desired by the operator. That is to say, the operator of the loader 30 can instruct the direction V13 to a desired direction by operating the touch panel GUI device 38. When the operator depresses any of the left, right, up, and down buttons allotted to the buttons 38A in the state where V13 is shown on the display portion 38B, the direction V13 is changed to left, right, up or down. The change amount is determined to be variable depending on the number of operating times or the operating time duration of the buttons 38A.

FIG. 10B illustrates a case where the final approach 10*a* is generated when the operator of the loader 30 instructs the direction V13 of the unmanned vehicle 20 at the switch-back point 13.

For example, the final approach 10*a* is defined uniquely if the following conditions are given for generating the final approach 10*a*:
a) at the switch-back point 13, the straight line showing the direction V13 of the unmanned vehicle 20 is in contact with an arc having a fixed radius r1 and extends along the arc,
b) at the loading point 12, the straight line is in contact with an arc having a fixed radius r2 and reaches the loading point 12 along the arc, and
c) movement is linear between the arc having the radius r1 and the arc having the radius r2. That is to say, the final approach 10*a* that moves from the switch-back point 13 (xE, yE) to a direction defined by the direction V13 along the arc having the fixed radius r1, moves linearly and reaches the loading point 12 along the arc having the fixed radius r2 is determined by geometric calculation. In this case, the operator should input a command "to instruct the direction V13 of the unmanned vehicle 20 at the switch-back point 13" by touching and depressing the buttons 38A. Specifically, a command "to instruct the direction V13 of the unmanned vehicle 20 at the switch-back point 13" is allotted to any of the buttons 38A, and when that button 38A is depressed, a signal showing that the direction V13 is instructed is outputted from the input device 33.

If necessary, the operator of the loader 30 can finely adjust the position of the instructed switch-back point 13 with reference to a trajectory (driving path along which the unmanned vehicle 20 is planned to travel, FIG. 8A) of the final approach 10*a* shown on the display portion 38B. In this case, the operator inputs a command "to finely adjust the switch-back point 13" by performing touching and depressing operation of the buttons 38A, further inputs a command "to move the switch-back point 13 on the display portion 38B", and further inputs a command "to establish the position of the switch-back point 13". Incidentally, the direction V13 of the unmanned vehicle 20 at the switch-back point 13 may be fine-tuned (step 503). Specifically, the moving directions on the display portion 38B, such as "left", "right", "up" and "down" of the direction V13 of the unmanned vehicle 20 at the switch-back point 13 are allotted to the respective buttons 38A in advance, and for example, when the button 38A to which "left" is allotted is depressed by the operator, the direction V13 designated on the display portion 38B moves in the left direction as viewed from the operator. The movement amount of the direction V13 is determined according to the number of times of depressing the buttons 38A or a duration of continuously depressing.

When the fine adjustment is performed (Y in step 503), the process returns to step 502, the relative positional relationship A is generated again, and the final approach 10*a* is determined again.

Then, the processing device 32 performs a process to judge whether or not the switch-back point 13 instructed by the operator is appropriate.

For example, if none of the conditions below is met:
a) instructed switch-back point 13 is outside the boundary line 1A of the loading site 1,
b) a minimum radius of curvature of the final approach 10*a* is less than the minimum turning radius of the unmanned vehicle 20 (minimum turning radius is a minimum radius at which the unmanned vehicle 20 can swivel and known), and
c) the unmanned vehicle 20 interferes with an obstacle (including the boundary line 1A of the loading site 1 and the loader 30) on the course of the final approach 10*a*, the switch-back point 13 is judged to be appropriate (Y in step 504), and the process proceeds to the next step 506, but if at least one of the above conditions is met, the switch-back point 13 instructed by the operator is not judged to be appropriate (N in step 504), and an alarm is issued to urge the switch-back point 13 to be instructed again (step 505). It can be judged whether or not the above conditions a) and c) are fulfilled from the positional relationship by comparing the coordinate information of the boundary line 1A and the coordinate information of the switch-back point 13 or the final approach 10a. The alarm may be shown as a message on the display portion 38B, but specific sound or voice that means warning may be issued by a sound generation device such as a loud speaker. And, the alarm may also be noticed to the operator by LED (light emitting diode) which is disposed at a part of the touch panel GUI device 38 and blinked or lighted if the alarm is necessary.

Thus, the operator instructs the switch-back point 13 again in step 501, and after that, the same processing is performed until it is judged in step 504 that the switch-back point 13 is appropriate. If it is judged that the switch-back point 13 is appropriate (Y in step 504), information and the like on the initial position P13 of the switch-back point 13 stored in the memory device 34 are transmitted to the supervising device 40, and the driving path 10 is generated in the same manner as in the above-described first embodiment. The generated driving path 10 is transmitted from the supervising device 40 to the loader 30, and the driving path 10 is shown on the display portion 38B. The information on the driving path 10 is also transmitted to the unmanned vehicle 20. The current position of the unmanned vehicle 20 may also be shown together with an icon showing the unmanned vehicle 20 on the display portion 38B (step 506: FIG. 8B). The driving path 10 is shown in a solid or dashed line on the display portion 38B.

When the driving path 10 is generated as described above, the unmanned vehicle 20 is controlled to travel along the driving path 10 to reach the loading point 12, where it stops and can perform a loading operation.

Here, if the loading point 12 is moved due to a movement or the like of the loader 30, the operator of the loader 30 performs an depressing operation of the buttons 38A to input a command "to instruct setting of the position P'12 of the next loading point 12'" (Y in step 507). Then, the position P'12 of the next loading point 12' and the next loading point direction V'12 are determined by the processing device 32 according to the command input. On the basis of the information on the position P'12 of the next loading point 12', the information on the next loading point direction V'12, and the information on the relative positional relationship A, the processing device 32 sets a new switch-back point 13' at a position where the relative positional relationship A can be maintained and performs a process to determine the position P'13 of the new switch-back point 13' by performing calculation. The position P'13 of the switch-back point 13' is determined in the same manner as the method shown in, for example, FIG. 10A or FIG. 10B. However, the position P'13 (x'E, y'E) of the new switch-back point 13' becomes a coordinate position which results from performing coordinate transformation of the x-y-axis by a relative angle of the next loading point direction V'12 and the initial loading point direction V12 and shifting the loading point 12 by a movement amount in the x-axis direction and a movement amount in the y-axis direction with respect to the position P13 (xE, yE) of the initial switch back 13.

Information on the position P'13 of the new switch-back point 13' is stored in the memory device 34 of the loader 30 (step 508).

After the new switch-back point 13' is set as described above, the process is then moved to step 504, and it is judged whether or not the new switch-back point 13' is appropriate in the same manner as above (step 504), and if the new switch-back point 13' is appropriate (Y in step 504), information and the like on the position P'13 of the new switch-back point 13' stored in the memory device 34 are transmitted to the supervising device 40, and a new driving path 10' is generated in the same manner as in the above-described first embodiment. The generated new driving path 10' is shown on the display portion 38B after it is taken into the processing device 32 from the supervising device 40 via the communication device 31 of the loader 30, and a process of converting into data that can be shown on the display portion 38B is performed by the processing device 32. The current position of the unmanned vehicle 20' may be shown together with an icon showing the unmanned vehicle 20' on the display portion 38B (step 506: FIG. 8B).

When the new driving path 10 is generated as described above, the unmanned vehicle 20' is controlled to travel along the new driving path 10' to reach the loading point 12', where it stops and can perform the loading operation.

The first embodiment and the second embodiment were explained above with reference to the right loading as an example. But, it is needless to mention that the present invention can be applied to any loading method as shown in FIGS. 7A, 7B, 7C and 7D.

FIGS. 11A and 11B illustrate cases of the oblique loading.

FIG. 11A shows a case where the loader 30 moves from a position Q to a position Q' along a face (the boundary line 1A in an area) of the loading site 1, and the loading point 12 moves to the loading point 12'. When the switch-back point 13 is instructed first, a new switch-back point 13' is set automatically according to the movement of the loader 30 along the face, and oblique loading can be performed. In FIG. 11A, a preset inclination angle α of the oblique loading is constant before and after the loading point 12 has moved. The value of the preset inclination angle α is stored previously in the memory device 34 of the loader 30. And, when the value of the preset inclination angle α is stored previously in the memory device 34 of the supervising device 40 and the oblique loading is selected by the operator of the loader 30, the preset inclination angle α may be read from the FIG. 11B shows a case where the loader 30 swivels the working machine 30a at a fixed position Q near the face of the loading site 1 and the loading point 12 moves to the loading point 12'. When the switch-back point 13 is instructed first, a new switch-back point 13' is set automatically according to the swivel of the working machine 30a, and the oblique loading can be performed. In FIG. 11B, the preset inclination angle of the oblique loading is changed from α to β when the loading point 12 is moved. The value of the preset inclination angle α is previously stored in the memory device 34 of the loader 30. And, it may be determined that the value of the preset inclination angle α is previously stored in the memory device 34 of the supervising device 40, and when the oblique loading is selected by the operator of the loader 30, the preset inclination angle α is read from the memory device 34.

Third Embodiment

It was described in the first embodiment and the second embodiment that the operator of the loader 30 instructs the position of the switch-back point 13. But, it is also possible to configure that the operator of the supervising device 40 instructs the position of the switch-back point 13.

When the operator of the supervising device 40 instructs the position of the switch-back point 13, the process performed by the loader 30 shown in FIG. 6A and the process of transmitting the position information on the switch-back point 13' from the loader 30 to the supervising device 40 in step 202 of FIG. 6B are not necessary.

And, in the case where the operator of the supervising device 40 instructs the position of the switch-back point 13, the touch panel GUI device 38 shown in FIG. 8 or a device having the equivalent functions is configured as the input device 43 and the display device 45 of the supervising device 40. In this case, the process of respective steps other than the process of setting the loading point in step 507 of FIG. 9 is performed by the supervising device 40.

Fourth Embodiment

It was described above that the switch-back point 13 where the unmanned vehicle 20 stops is instructed as a desired point. But, the present invention is not limited to the point such as the switch-back point 13 where the unmanned vehicle 20 stops once, but can also be applied to a case that a passing point where the unmanned vehicle 20 passes through without stopping is instructed, as long as it is a point on the driving path 10 between the entry point 11 and the loading point 12. For example, it is also possible to set automatically a new passing point 16' while maintaining the relative positional relationship A between the passing point 16 and the loading point 12 according to the movement of the loading point 12 to the loading point 12' by instructing as the initial position a passing point 16 on the first half 10b of the driving path between the switch-back point 13 and the entry point 11 as shown in FIG. 12.

Fifth Embodiment

It was described above that the loading site 1 is assumed, and the operator of the loader 30 or the operator of the supervising device 40 instructs the stopover point 14 (switch-back point 13, passing point 16) on the driving path 10 leading to the loading point 12. But, the present invention can be applied to respective areas of the working site to which the unmanned vehicle driving system is applied. For example, the present invention can be applied to a case where a stopover point on the driving path leading the unmanned vehicle 20 to an unloading point in an earth unloading site is instructed. The earth unloading site is a place where the cargo loaded on the load-carrying platform of the unmanned vehicle 20 is unloaded. In this case, for example, the operator of the earth moving machine such as a bulldozer that exists at the unloading point instructs a stopover point. And, in a case where the stopover point on the driving path leading to a fuelling point is instructed at the fuelling station, the present invention can be applied. The fuelling station is a place where the unmanned vehicle 20 is replenished with the fuel. In this case, for example, the operator of the fuel truck such as a tanker that exists at the fuelling point instructs a stopover point. The present embodiment can also be applied when a stationary facility such as a fuelling facility is used instead of the fuel truck.

Sixth Embodiment

It was described above assuming that the vehicle (delivery vehicle) carrying the cargo travels along the outdoor driving path. But, the present invention can also be applied to a case where the delivery vehicle is caused to travel along an indoor driving path. For example, the present invention is applied to an unmanned delivery system using an unmanned delivery vehicle which operates in a factory, a warehouse and the like, and the stopover point may be set automatically by instructing the stopover point on the driving path generated in the indoor area within the factory, the warehouse and the like according to the movement of a target point of the unmanned delivery vehicle. The target point of the unmanned delivery vehicle is assumed to be a loading position (loading point) where a multi-axis robot takes cargo from a shelf in the warehouse and loads it on the unmanned delivery vehicle.

According to the respective embodiments described above, the stopover point 14 such as the switch-back point 13 can be instructed and set at an most appropriate point for the operator to improve workability. Once the stopover point 14 such as the switch-back point 13 is set, even if the target point, such as the loading point 12, of the loader 30 moves, the stopover point 14 such as the new switch-back point 13' is set automatically at a position where the relative positional relationship A between the target point and the stopover point 14 can be maintained. Therefore, a troublesome and burdensome work of solely searching for the most appropriate point each time the target point such as the loading point 12 moves and instructing that point is unnecessary, and workability of the operator of the loader 30 is improved.

For example, in the case where the loader 30 is a wheel loader as shown in FIG. 2, a V-shaped drive is performed during the movement from a point where the face was excavated to the loading point 12, and the wheel loader which is near the face needs to secure a predetermined travel area B for performing the V-shaped drive. The V-shaped drive is a series of operation in which a forward travel is performed to scoop earth and sand by the bucket of the wheel loader as indicated by V in FIG. 2, a change to reverse travel is made after scooping earth and sand, and a further change to the forward travel is made to perform loading operation onto a dump truck.

The operator of the loader 30 visually checks to know a travel area B to be secured for the V-shaped drive. And, the loading point 12 and the switch-back point 13 are instructed so as to avoid the travel area B. It is to be understood that the travel area B indicated by the dashed line in FIG. 2 is not an area in some area data or coordinate data but an area imaged by the operator.

According to this embodiment, since the operator can instruct a stopover point such as the switch-back point 13 so as to avoid the travel area B, unnecessary interference between the unmanned vehicle 20 and the loader 30 is prevented, and the loading operation can be performed with high workability.

Seventh Embodiment

It was described in the first embodiment, the second embodiment and the third embodiment that the switch-back point 13 moves its position according to the position change of the loading point 12.

But, it is also possible to instruct information on the position P13, treating the switch-back point 13 as a fixed point which does not move its position.

For example, when the loading site 1 is small in width as shown in FIG. 13A, the most appropriate switch-back point 13 is conventionally computed automatically by an arithmetic unit, and thus, the operation does not converge and a solution cannot be obtained. As a result, the most appropriate switch-back point 13 cannot be searched for occasionally. But, there is a case where the operator of the loader 30 or the operator of the supervising device 40 visually checks to find, for example, an area C which expands partly in the width direction of the loading site 1, and can instruct immediately the switch-back point 13 within the area C.

In such a case, the operator may instruct information on the position P13 of the switch-back point 13 as a fixed point which does not move. Specifically, the operator instructs the point 13 as a fixed point (hereinafter, called fixed position P13), with the use of the touch panel GUI device 38, by touching and depressing any position of the map displayed on the screen of the display portion 38B, and depressing a button having a function to instruct a fixed point and allotted to any button of the buttons 38A. The operator of the supervising device 40 may instruct this fixed point by operating the input device 43 or the display device 45 of the supervising device 40.

When the fixed position P13 of the switch-back point 13 is instructed, on the basis of the information on the fixed position P13 of the switch-back point 13, the information on the position P12 of the loading point 12 of the loader 30, and the information on the loading point direction V12 of the unmanned vehicle 20 at the loading point 12, the supervising device 40 generates the driving path 10 leading to the loading point 12 via the instructed switch-back point 13, the unmanned vehicle 20 receives the information on the generated driving path 10 from the supervising device 40, and the unmanned vehicle 20 travels to the loading point 12 along the driving path 10 via the switch-back point 13.

Even if the loading point 12 moves to the loading point 12' due to the movement of the loader 30, the position of the switch-back point 13 maintains the fixed position P13. That is to say, on the basis of information on the position P'12 of the next loading point 12', information on the loading point direction V'12 of the unmanned vehicle 20' at the loading point 12', and information on the fixed position P13 of the switch-back point 13, a new driving path 10' leading to the next loading point 12' via the switch back 13 is generated, and on the basis of the information on the generated new driving path 10', the unmanned vehicle 20' travels to the loading point 12' along the new driving path 10' via the switch-back point 13.

Similar to the fourth embodiment, it is possible to instruct a passing point where the unmanned vehicle 20 passes through without stopping as a fixed point which does not move the position as long as a point is on the driving path 10 between the entry point 11 and the loading point 12, not limited to the point such as the switch-back point 13 where the unmanned vehicle 20 stops. For example, as shown in FIG. 13B, when the operator instructs as a fixed point, which does not move the position, the passing point 16 on the first half 10b of the driving path between the switch-back point 13 and the entry point 11, the new driving path 10' (dashed line in FIG. 13B) can be generated while the position of the passing point 16 is maintained fixed even if the loading point 12 moves to the loading point 12'.

Needless to say, in a case where the unmanned vehicle 20 travels in an area other than the loading site explained in the fifth embodiment or indoors of the sixth embodiment, the operator can instruct the stopover point 14 such as the switch-back point 13 or the passing point 16 as a fixed point which does not move the position.

According to the seventh embodiment, the stopover point 14 such as the switch-back point 13 can be instructed and set at the most appropriate point for the operator to improve workability. Once the stopover point 14 such as the switch-back point 13 is generated, even if the target point such as the loading point 12 moves, the driving paths 10, 10' are generated while the position of the stopover point 14 such as the switch-back point 13 remains fixed, the driving path to the stopover point 14 such as the switch-back point 13 is fixed, and the next unmanned vehicle 20' can travel continuously to the vicinity of the stopover point 14 such as the switch-back point 13. As a result, a production efficiency of the working site is improved dramatically.

For example, in FIG. 13A, when the loader 30 is loading earth and sand onto the unmanned vehicle 20 at the loading point 12, the next unmanned vehicle 20', the following unmanned vehicle 20" and the like can be entered the first half 10b of the driving path successively, and the loading operation can be performed continuously without wasting time waiting.

In FIG. 13B, when the loader 30 is loading earth and sand onto the unmanned vehicle 20 at the loading point 12, the next unmanned vehicle 20', the following unmanned vehicle 20" and the like can be proceeded successively to reach just before the passing point 16 in the first half 10b of the driving path, and the loading operation can be performed continuously without wasting waiting time.

Eighth Embodiment

In the first embodiment, the second embodiment and the third embodiment, it is described that the switch-back point 13 is generated in the area of the loading site 1.

But, as shown in FIG. 14, the switch-back point 13 can also be instructed and set outside the area of the loading site 1 and just before the entry point 11. That is to say, the switch-back point 13 as mentioned above is required when the area of the loading site 1 is limited by the minimum swivel radius of the unmanned vehicle 20 and does not have an area and a width enough to set the switch-back point 13. In this case, the driving path 10 is defined to include a path just before the entry point 11 of the loading site 1. In this embodiment, terrain information of the outside of the area of the loading site 1 is also shown on the display portion 38B as shown in FIG. 14. The switch-back point 13 may be instructed as a fixed point similar to the seventh embodiment. Specific methods of instructing and setting the switch-back point 13 and the loading point 12 are the same as in the above-described embodiment.

According to the eighth embodiment, the unmanned vehicle 20 performs switch-back at the switch-back point 13 just before the entry point 11 and can travel in a reverse traveling state to the loading point 12 via the entry point 11.

BRIEF DESCRIPTION OF THE DRAWINGS

FIGS. 7A, 7B, 7C and 7D are diagrams to be referred to when various loading methods are illustrated.

Figure 1A:
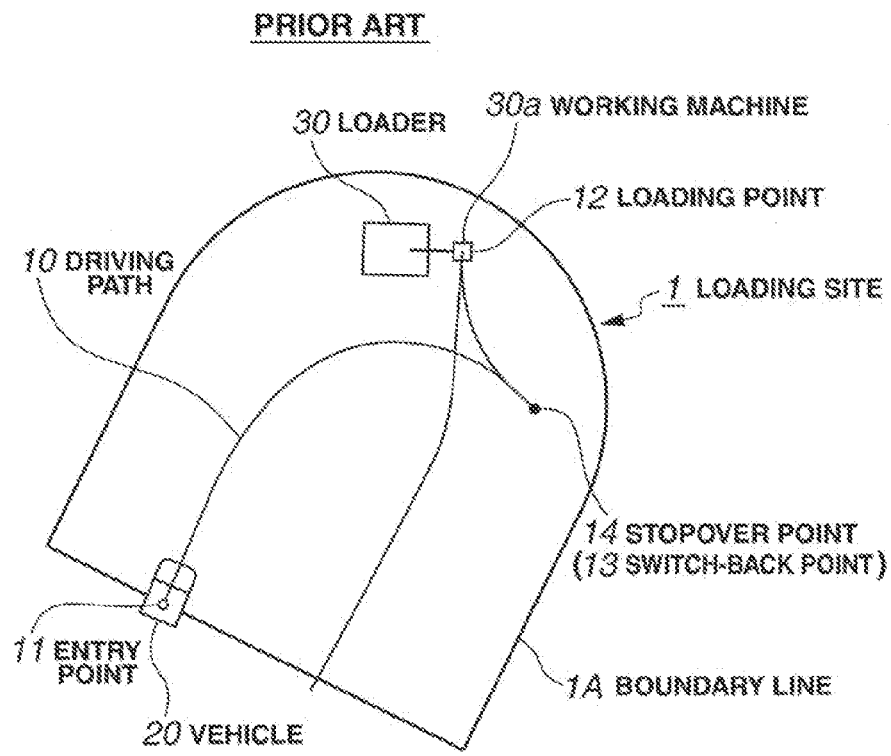
FIGS. 1A and 1B are top plan views of a loading site to be referred to when prior art is explained.
Figure 1B:
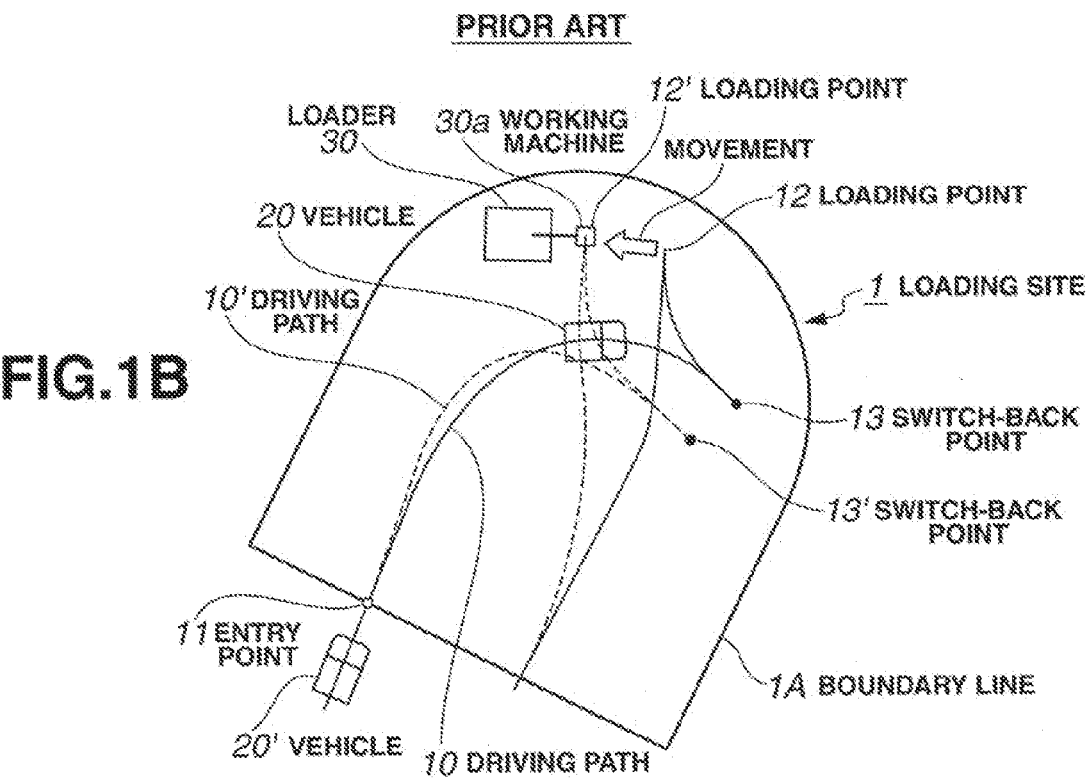
Figure 2:
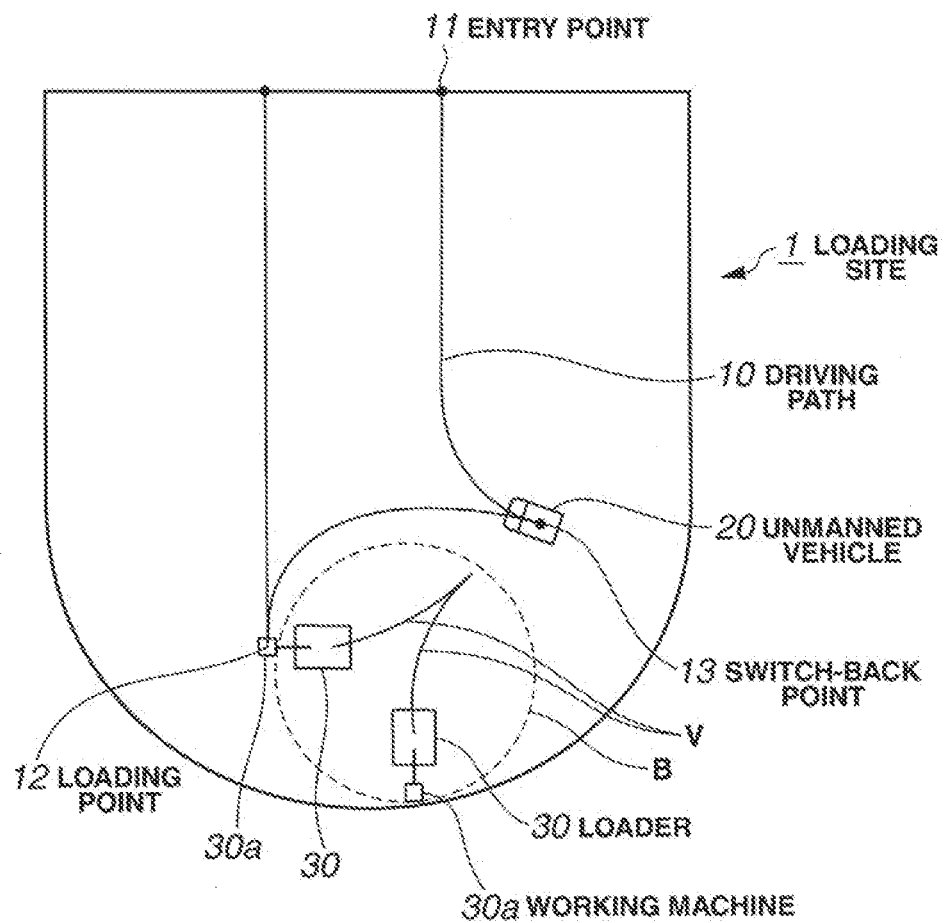
FIG. 2 is a top plan view of a loading site to be referred to when problems of prior art and effects of the present invention are explained.
Figure 3:
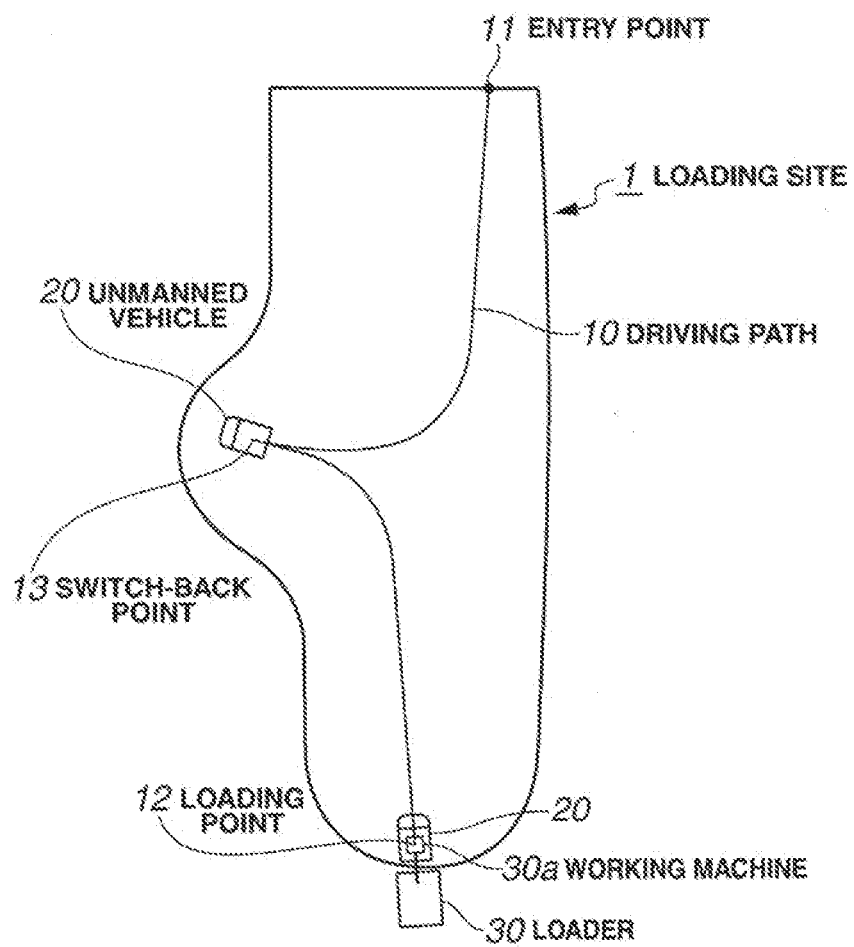
FIG. 3 is a top plan view of a loading site to be referred to when problems of prior art are explained.
Figure 4:
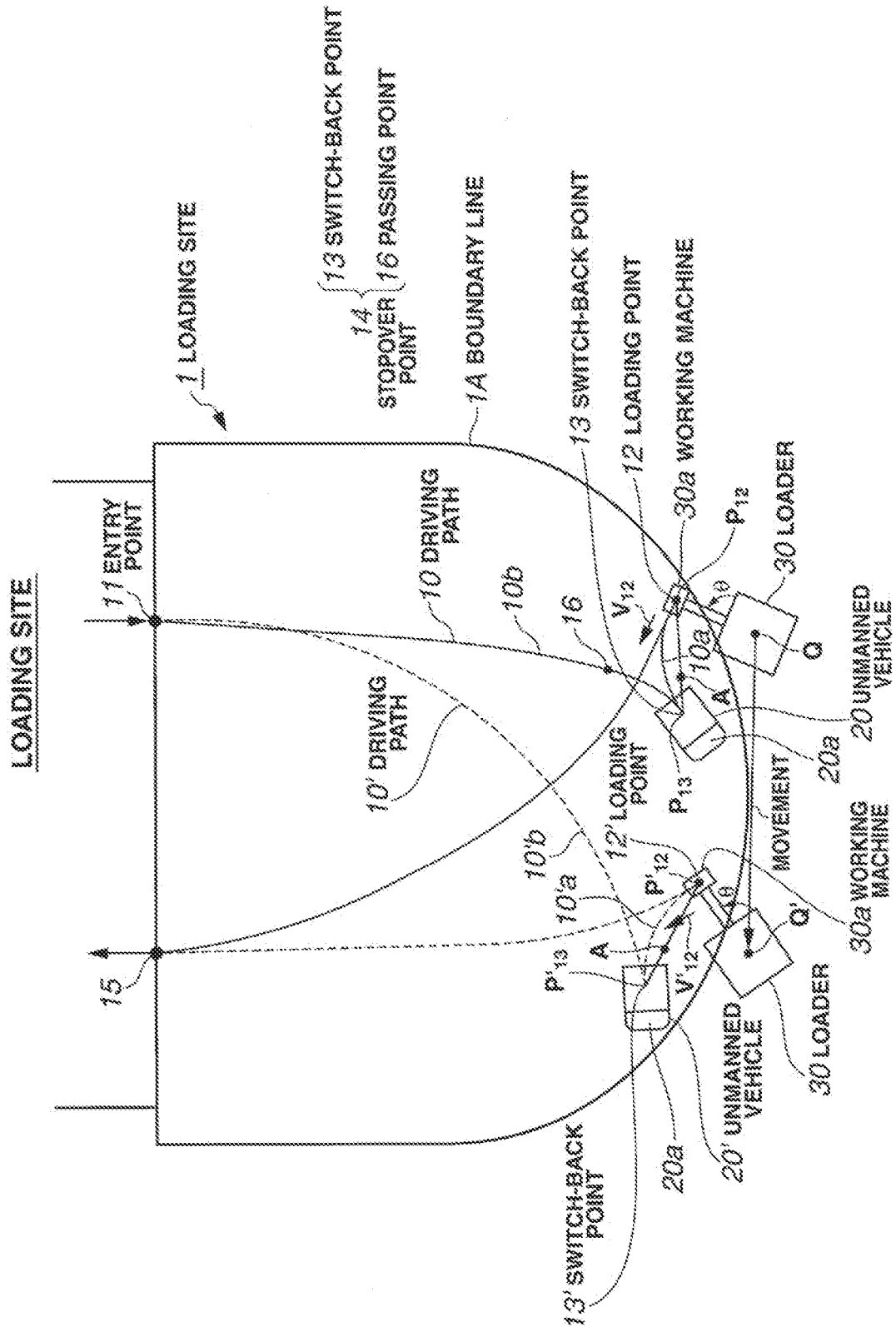
FIG. 4 is a top plan view of a loading site.
Figure 5:
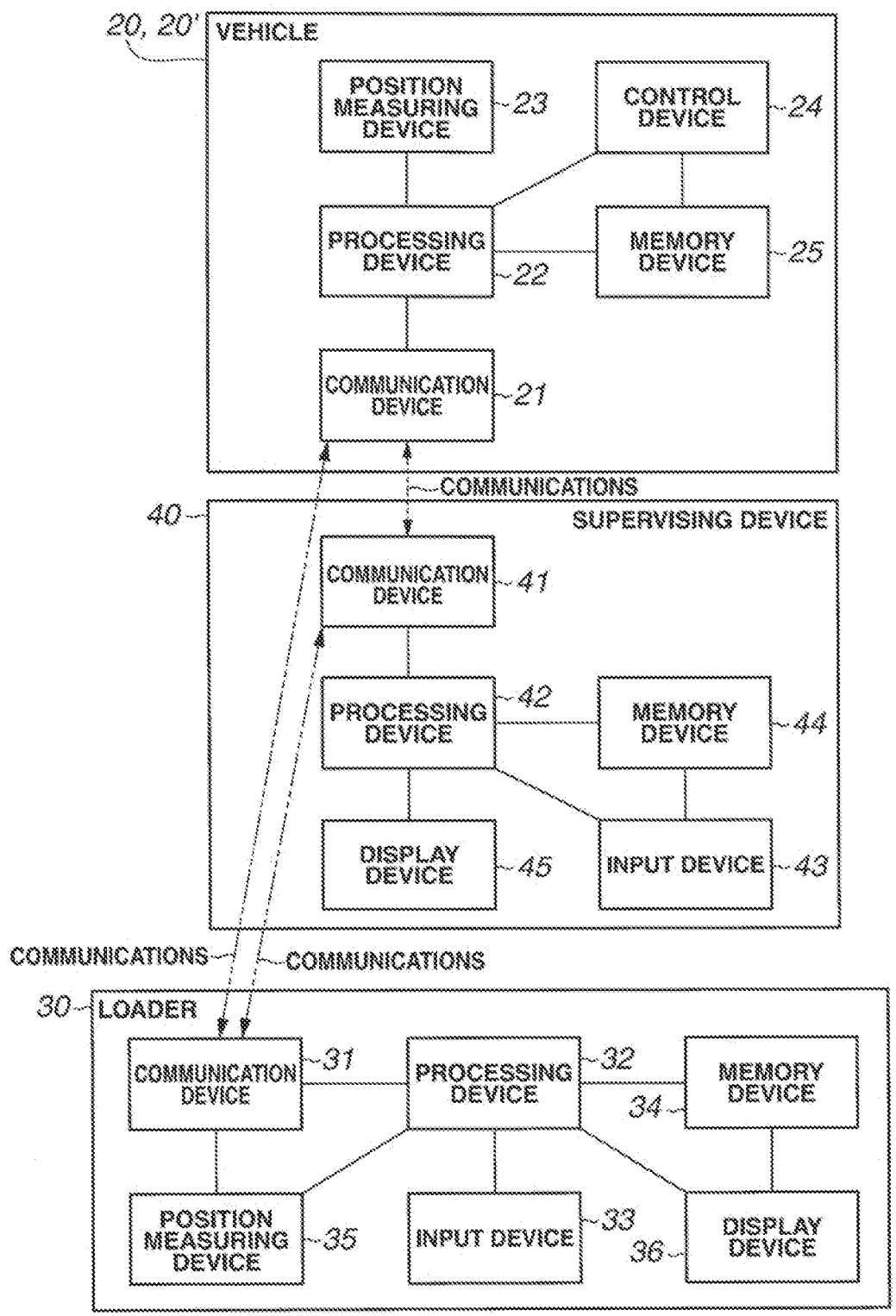
FIG. 5 is a block diagram of an unmanned vehicle driving system of an embodiment.
Figure 6A:
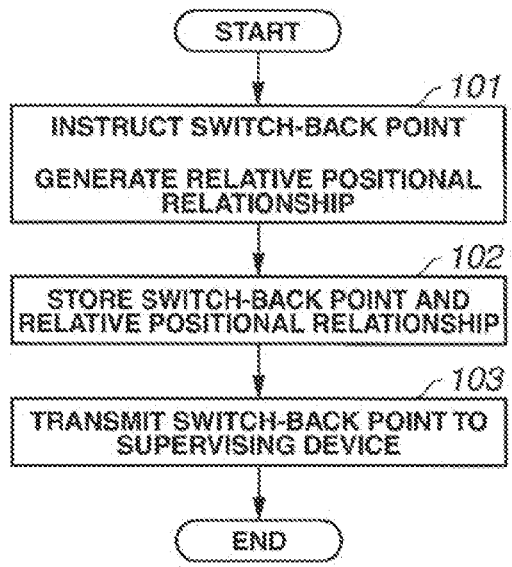
FIGS. 6A, 6B and 6C are flowcharts to be referred to when a first embodiment is explained.
Figure 6B:
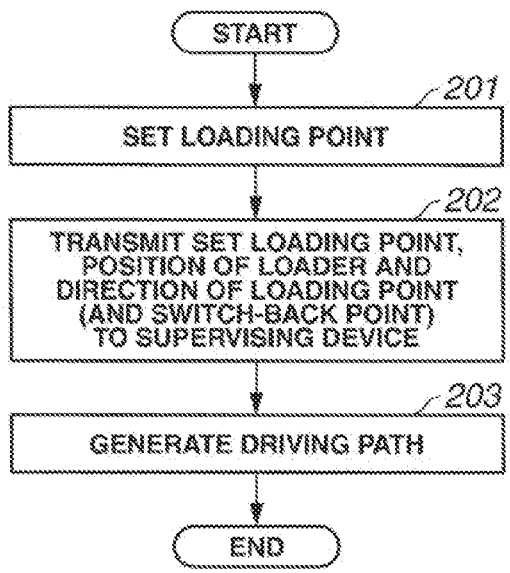
Figure 6C:
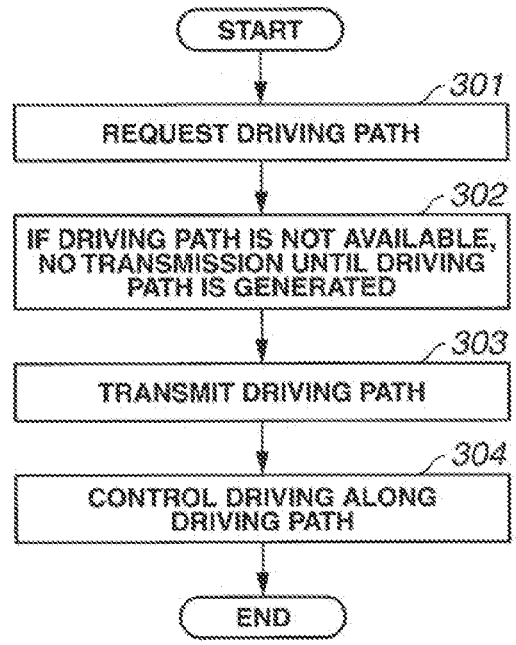
Figure 8A:
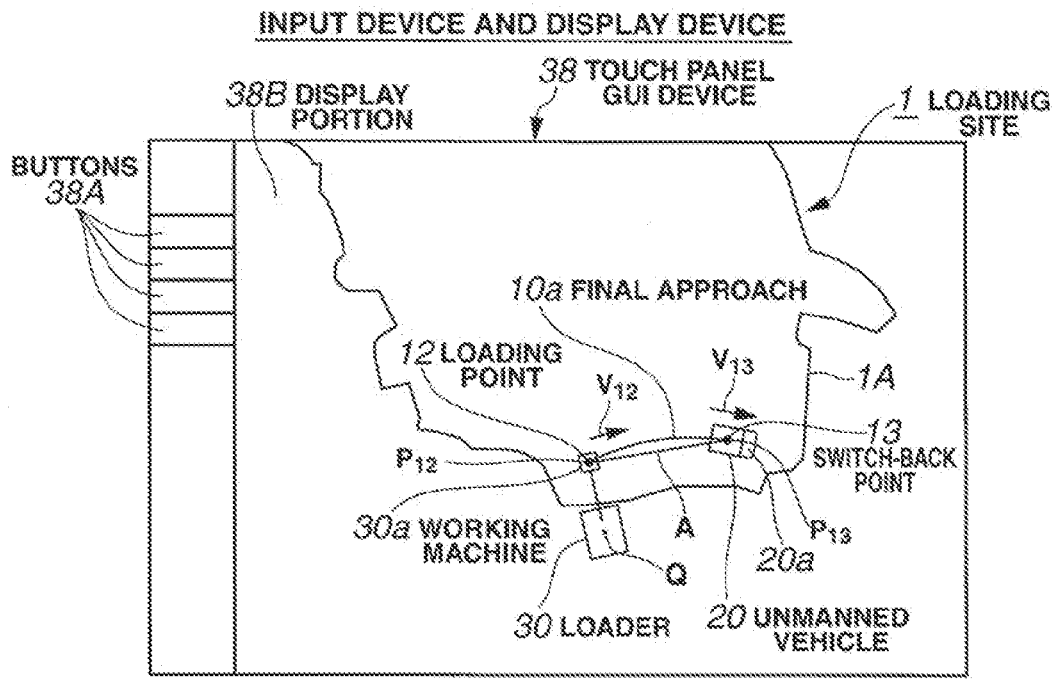
FIGS. 8A and 8B are diagrams to be referred to when structure examples of an input device and a display device of a loader are explained.
Figure 8B:
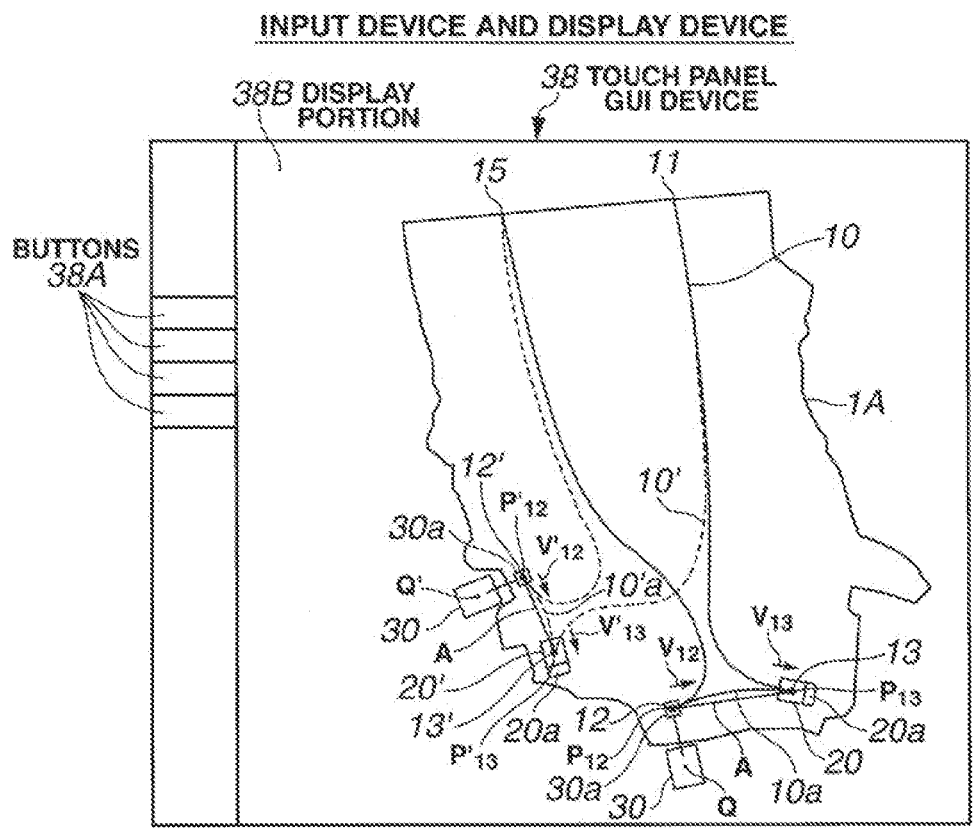
Figure 9:
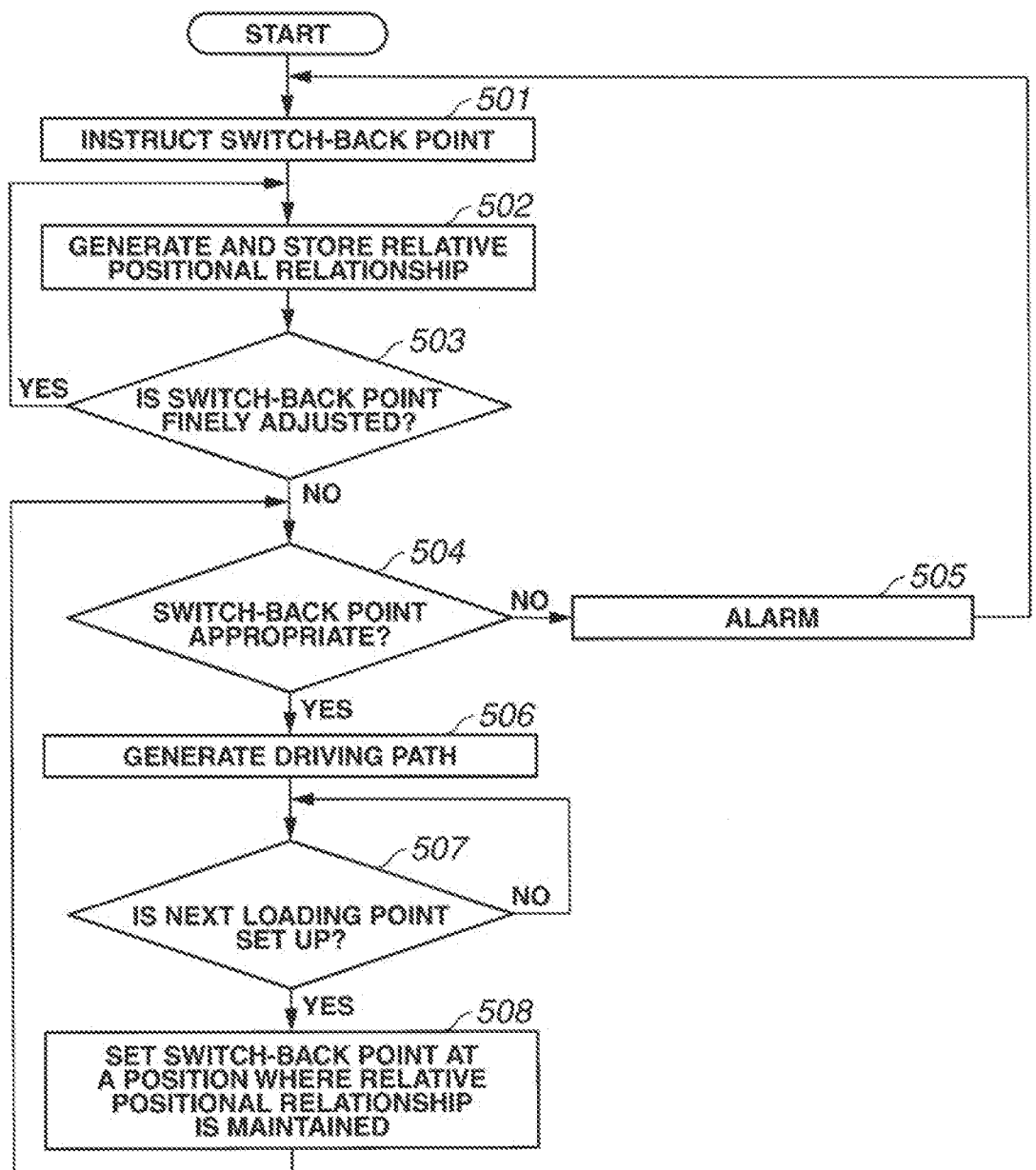
FIG. 9 is a flowchart showing a processing procedure of a second embodiment corresponding to the structure example of FIG. 8.
Figure 10A:
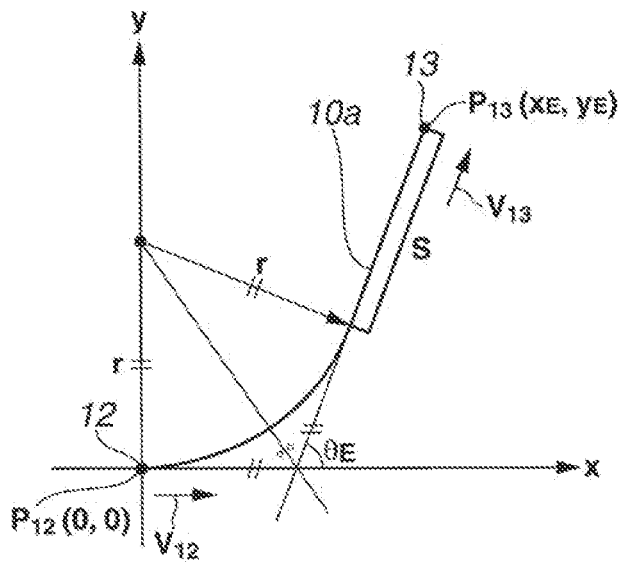
FIGS. 10A and 10B are diagrams to be referred to when a process to create a final approach is explained.
Figure 10B:
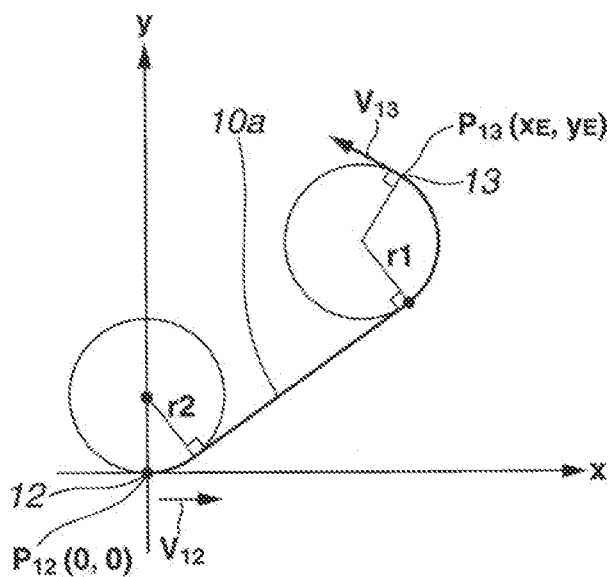
Figure 11A:
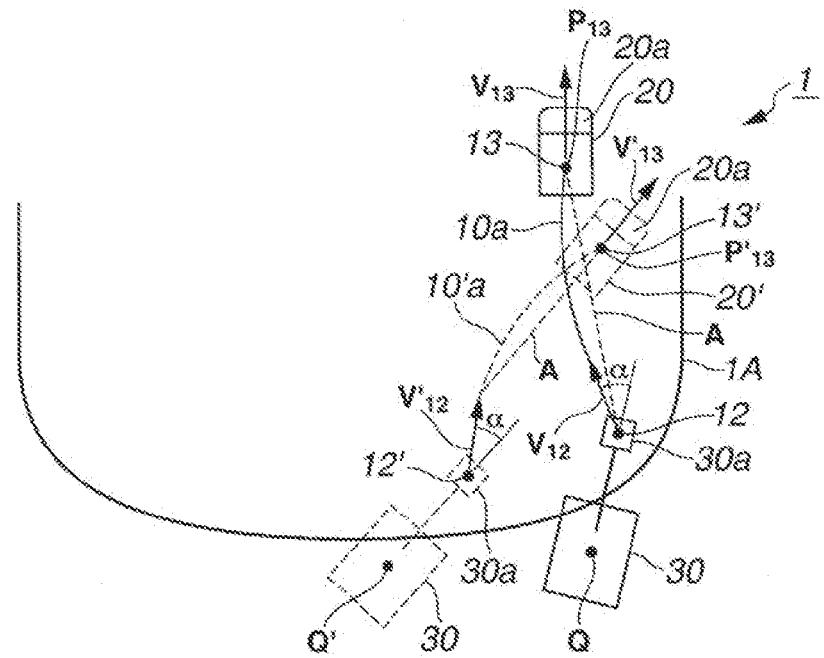
FIGS. 11A and 11B are top plan views of a loading site to be referred to when oblique loading is illustrated.
Figure 11B:
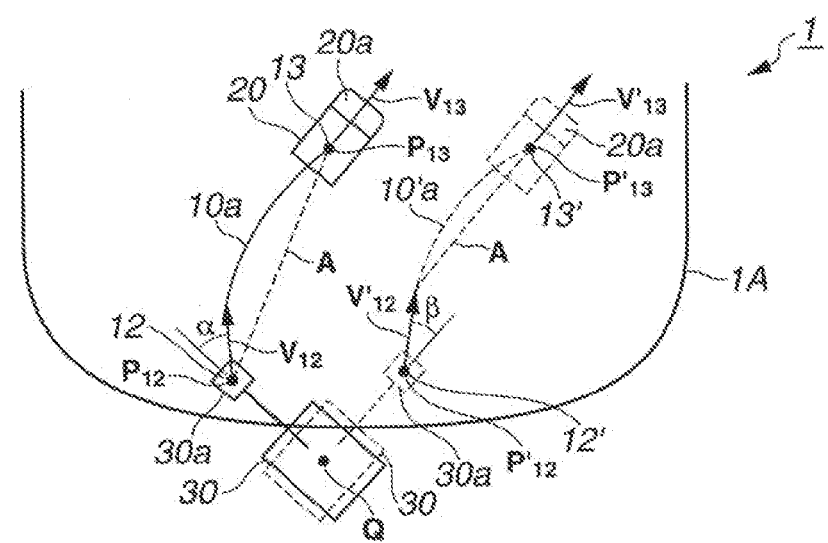
Figure 12:
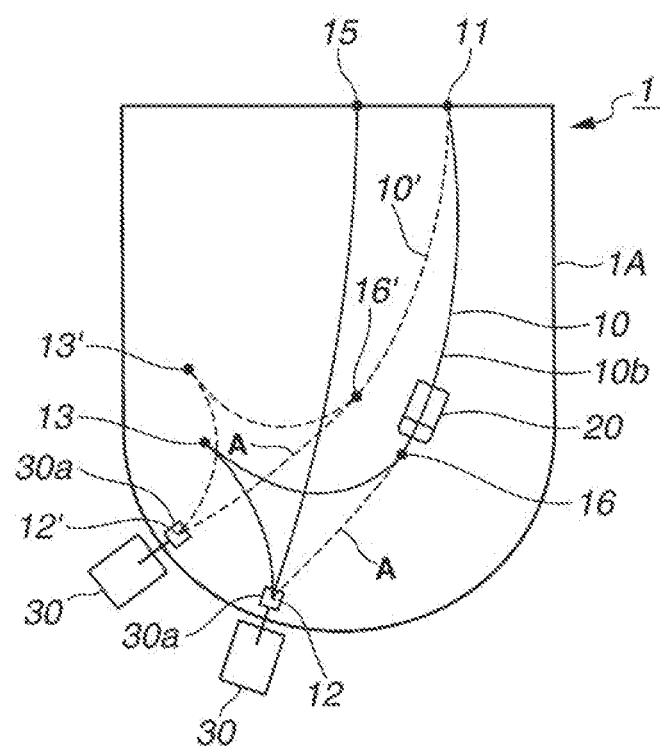
FIG. 12 is a top plan view of a loading site to be referred to when another embodiment is explained.
Figure 13A:
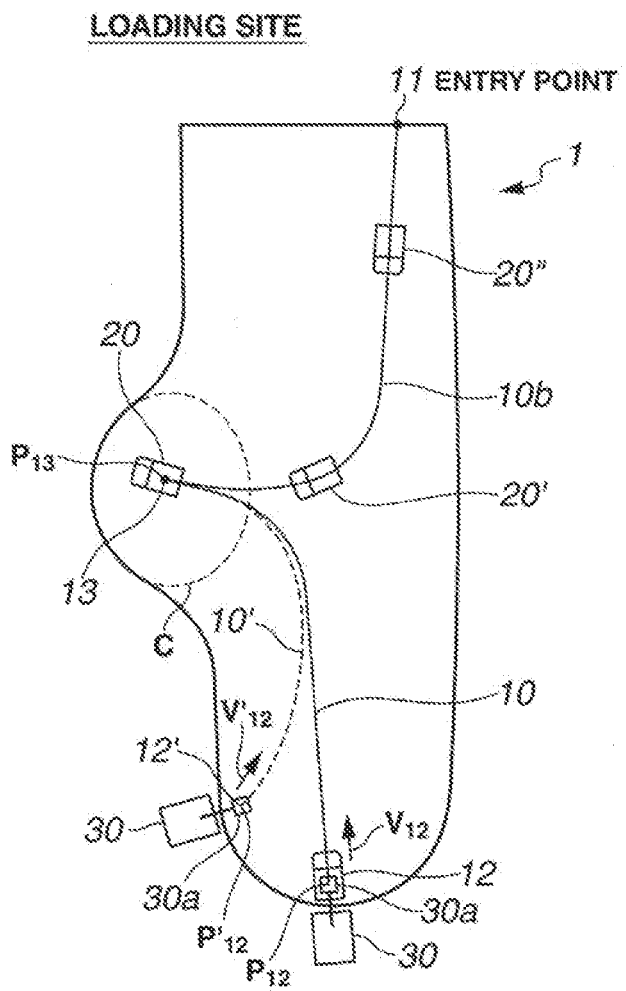
FIGS. 13A and 13B are top plan views of loading sites to be referred to when another embodiment is explained.
Figure 13B:
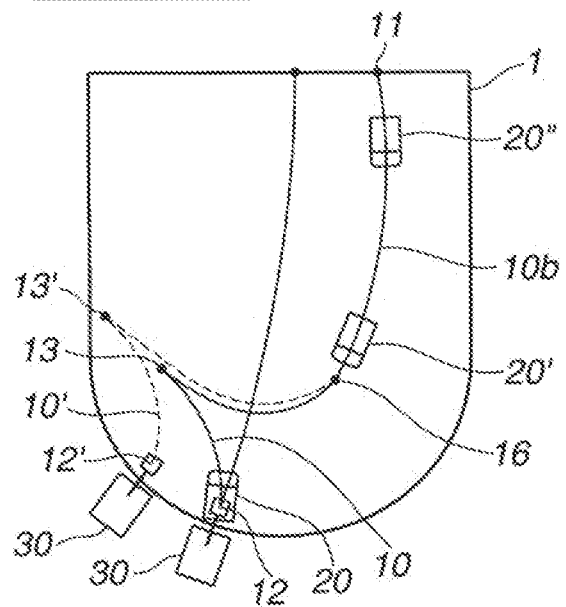
Figure 14:
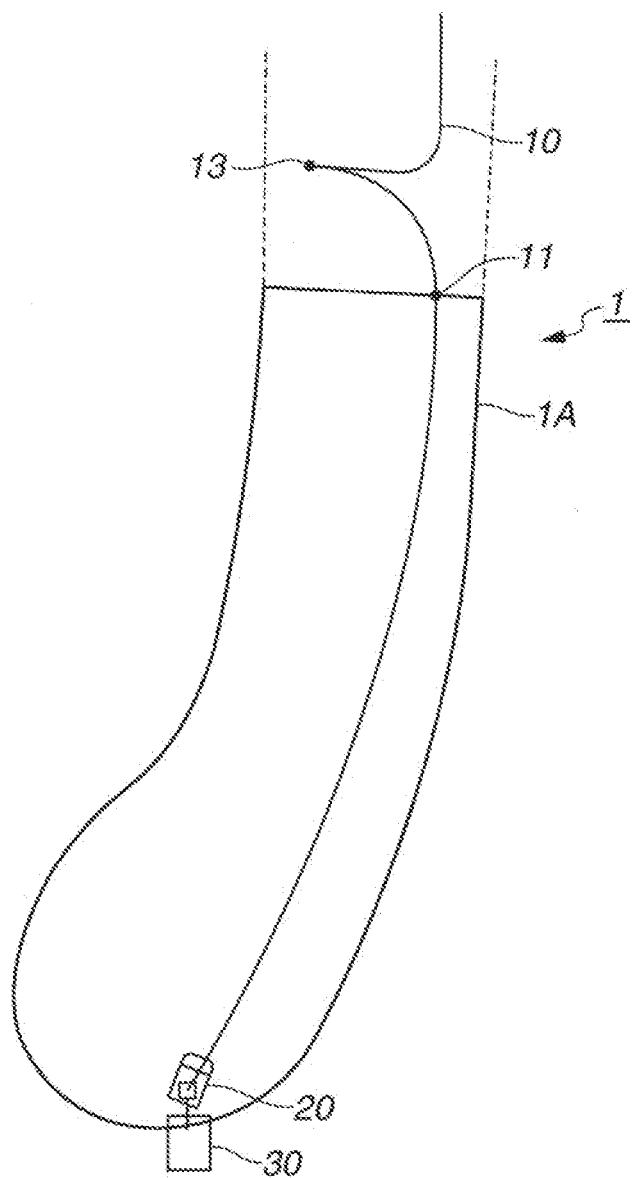
FIG. 14 is a top plan view of a loading site to be referred to when another embodiment is explained.

The invention claimed is:

1. A driving system of an unmanned vehicle, which generates a driving path for the unmanned vehicle and causes to travel the unmanned vehicle along the generated driving path to a target point, the system comprising:

stopover point instructing means which instructs initial position information of a stopover point on a driving path and before a target point, the stopover point being a moving point which moves in position according to a position movement of the target point;

relative positional relationship information generating means which generates information on a relative positional relationship between the target point and the stopover point on the basis of the initial position information on the stopover point instructed by the stopover point instructing means and position information on the target point;

stopover point setting means which, when the position of the target point moves, sets a new stopover point at a position where the relative positional relationship can be maintained on the basis of position information on the position-moved target point, information on a direction of the unmanned vehicle at the position-moved target point, and the relative positional relationship information;

driving path generating means which, when the initial position of the stopover point is instructed by the stopover point instructing means, generates a driving path leading to the target point via the instructed stopover point on the basis of the initial position information on the stopover point and, when the position of the target point moves, generates a driving path leading to the position-moved target point via the new stopover point set by the stopover point setting means; and driving control means which causes the unmanned vehicle to travel along the driving path to the target point via the stopover point on the basis of the information on the generated driving path.

2. A driving system of an unmanned vehicle, which generates a driving path for the unmanned vehicle and causes the unmanned vehicle to travel along the generated driving path to a target point, the system comprising:

stopover point instructing means which instructs position information of a stopover point on a driving path and before a target point, the stopover point being a fixed point which does not move in position;

driving path generating means which, when a fixed position of the stopover point is instructed by the stopover point instructing means, generates a driving path leading to the target point via the instructed stopover point on the basis of the fixed position information on the stopover point, position information on the target point, and information on a direction of the unmanned vehicle at the target point, and when the position of the target point moves, generates a driving path leading to the position-moved target point via the stopover point on the basis of the position information on the position-moved target point, the information on the direction of the unmanned vehicle at the position-moved target point, and the fixed position information on the stopover point; and driving control means which causes the unmanned vehicle to travel along the driving path to the target point via the stopover point on the basis of the information on the generated driving path.

3. The driving system of an unmanned vehicle according to claim 1, wherein the unmanned vehicle is a dump truck, the stopover point is a switch-back point, and the target point is a loading point where a loader as a working vehicle performs a loading operation onto a dump truck.

4. The driving system of an unmanned vehicle according to claim 3, wherein the driving path is a path leading from an entry point of the loading site to the loading point in an area of a loading site via the switch-back point in the area of the loading site.

5. The driving system of an unmanned vehicle according to claim 3, wherein the driving path includes a path just before the entry point of a loading site, and the switch-back point is instructed and set at a point outside the area of the loading site and just before the entry point.

6. The driving system of an unmanned vehicle according to claim 1, wherein the stopover point instructing means is provided in the working vehicle existing at the target point.

7. The driving system of an unmanned vehicle according to claim 1, wherein the stopover point instructing means is provided in a supervising device capable of communicating with the unmanned vehicle and a working vehicle existing at the target point by means of communication means.

8. A driving path generation method for an unmanned vehicle, which generates a driving path leading to a target point of the unmanned vehicle, comprising:

instructing initial position information of a stopover point on a driving path and before a target point, the stopover point being a moving point which moves in position according to a position movement of the target point;

when the initial position of the stopover point is instructed, generating a driving path leading to the target point via the instructed stopover point on the basis of the initial position information on the stopover point, and generating information on a relative positional relationship between the target point and the stopover point on the basis of the initial position information on the instructed stopover point and position information on the target point; and when the position of the target point moves, setting a new stopover point at a position where the relative positional relationship can be maintained on the basis of position information on the position-moved, target point, information on a direction of the unmanned vehicle at the position-moved target point, and the relative positional relationship information, and generating a driving path leading to the position-moved target point via the newly set stopover point.

9. A driving path generation method for an unmanned vehicle, which generates a driving path leading to a target point of the unmanned vehicle, comprising:

instructing position information of a stopover point on a driving path and before a target point, the stopover point being a fixed point which does not move in position;

when a fixed position of the stopover point is instructed, generating a driving path leading to the target point via the instructed stopover point on the basis of the fixed position information on the stopover point, position information on the target point, and information on a direction of the unmanned vehicle at the target point; and
when the position of the target point moves, generating a driving path leading to the position-moved target point via the stopover point on the basis of the position information on the position-moved target point, the information on the direction of the unmanned vehicle at the position-moved target point, and the fixed position information on the stopover point.

10. The driving system of an unmanned vehicle according to claim 2, wherein the unmanned vehicle is a dump truck, the stopover point is a switch-back point, and the target point is a loading point where a loader as a working vehicle performs a loading operation onto a dump truck.

11. The driving system of an unmanned vehicle according to claim 10, wherein the driving path is a path leading from an entry point of the loading site to the loading point in an area of a loading site via the switch-back point in the area of loading site.

12. The driving system of an unmanned vehicle according to claim 10, wherein the driving path includes a path just before the entry point of a loading site, and the switch-back point is instructed and set at a point outside the area of the loading site and just before the entry point.

13. The driving system of an unmanned vehicle according to claim 2, wherein the stopover point instructing means is provided in the working vehicle existing at the target point.

14. The driving system of an unmanned vehicle according to claim 3, wherein the stopover point instructing means is provided in the working vehicle existing at the target point.

15. The driving system of an unmanned vehicle according to claim 10, wherein the stopover point instructing means is provided in the working vehicle existing at the target point.

16. The driving system of an unmanned vehicle according to claim 4, wherein the stopover point instructing means is provided in the working vehicle existing at the target point.

17. The driving system of an unmanned vehicle according to claim 11, wherein the stopover point instructing means is provided in the working vehicle existing at the target point.

18. The driving system of an unmanned vehicle according to claim 5, wherein the stopover point instructing means is provided in the working vehicle existing at the target point.

19. The driving system of an unmanned vehicle according to claim 12, wherein the stopover point instructing means is provided in the working vehicle existing at the target point.

20. The driving system of an unmanned vehicle according to claim 2, wherein the stopover point instructing means is provided in a supervising device capable of communicating with the unmanned vehicle and a working vehicle existing at the target point by means of communication means.

* * * * *